United States Patent
Nag et al.

(10) Patent No.: US 11,042,640 B2
(45) Date of Patent: Jun. 22, 2021

(54) SAFE-OPERATION-CONSTRAINED REINFORCEMENT-LEARNING-BASED APPLICATION MANAGER

(71) Applicant: VMware, Inc., Palo Alto, CA (US)

(72) Inventors: Dev Nag, Palo Alto, CA (US); Gregory T. Burk, Colorado Springs, CO (US); Yanislav Yankov, Palo Alto, CA (US); Nicholas Mark Grant Stephen, Paris (FR); Dongni Wang, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 11 days.

(21) Appl. No.: 16/502,587

(22) Filed: Jul. 3, 2019

(65) Prior Publication Data

US 2020/0065495 A1 Feb. 27, 2020

Related U.S. Application Data

(63) Continuation-in-part of application No. 16/261,253, filed on Jan. 29, 2019, now Pat. No. 10,802,864.

(60) Provisional application No. 62/723,388, filed on Aug. 27, 2018.

(51) Int. Cl.
  *G06F 21/57* (2013.01)
  *G06N 20/00* (2019.01)

(52) U.S. Cl.
  CPC ............ *G06F 21/57* (2013.01); *G06N 20/00* (2019.01); *G06F 2221/034* (2013.01)

(58) Field of Classification Search
  USPC .......................................................... 718/1
  See application file for complete search history.

(56) References Cited

U.S. PATENT DOCUMENTS

| | | | |
|---|---|---|---|
| 9,911,290 B1* | 3/2018 | Zalewski | G06Q 20/327 |
| 2009/0012922 A1* | 1/2009 | Tesauro | G06Q 10/06 706/12 |
| 2017/0213151 A1* | 7/2017 | Uchibe | G06N 20/00 |
| 2018/0082208 A1* | 3/2018 | Cormier | G06K 9/6284 |
| 2018/0165603 A1* | 6/2018 | Van Seijen | G06N 5/043 |
| 2018/0366020 A1* | 12/2018 | Bilic | G06F 16/907 |
| 2019/0102676 A1* | 4/2019 | Nazari | G06F 17/18 |
| 2019/0116560 A1* | 4/2019 | Naderializadeh | H04W 52/28 |
| 2019/0171438 A1* | 6/2019 | Franchitti | G06N 5/022 |

* cited by examiner

*Primary Examiner* — John Q Chavis

(57) ABSTRACT

The current document is directed to a safe-operation-constrained reinforcement-learning-based application manager that can be deployed in various different computational environments, without extensive manual modification and interface development, to manage the computational environments with respect to one or more reward-specified goals. Control actions undertaken by the safe-operation-constrained reinforcement-learning-based application manager are constrained, by stored action filters, to constrain state/action-space exploration by the safe-operation-constrained reinforcement-learning-based application manager to safe actions and thus prevent deleterious impact to the managed computational environment.

20 Claims, 44 Drawing Sheets

$R_4 = r_5 + \gamma r_6 + \gamma^2 r_7 + \gamma^3 r_8 \ldots \gamma^{T-5} r_T$ where $0 \leq \gamma \leq 1$ $R_t = \sum_{k=0}^{T} \gamma^k r_{t+k+1}$ $Y^\pi(s) = E\{R_t \mid s_t = s, \pi\}$ $Q^\pi(s,a) = E\{R_t \mid s_t = s, a_t = a, \pi\}$ $\pi^*$ is optimal $\Rightarrow \forall s \in S$ and $\pi \in \Pi$, $V^{\pi^*}(s) \geq V^\pi(s)$

FIG. 17

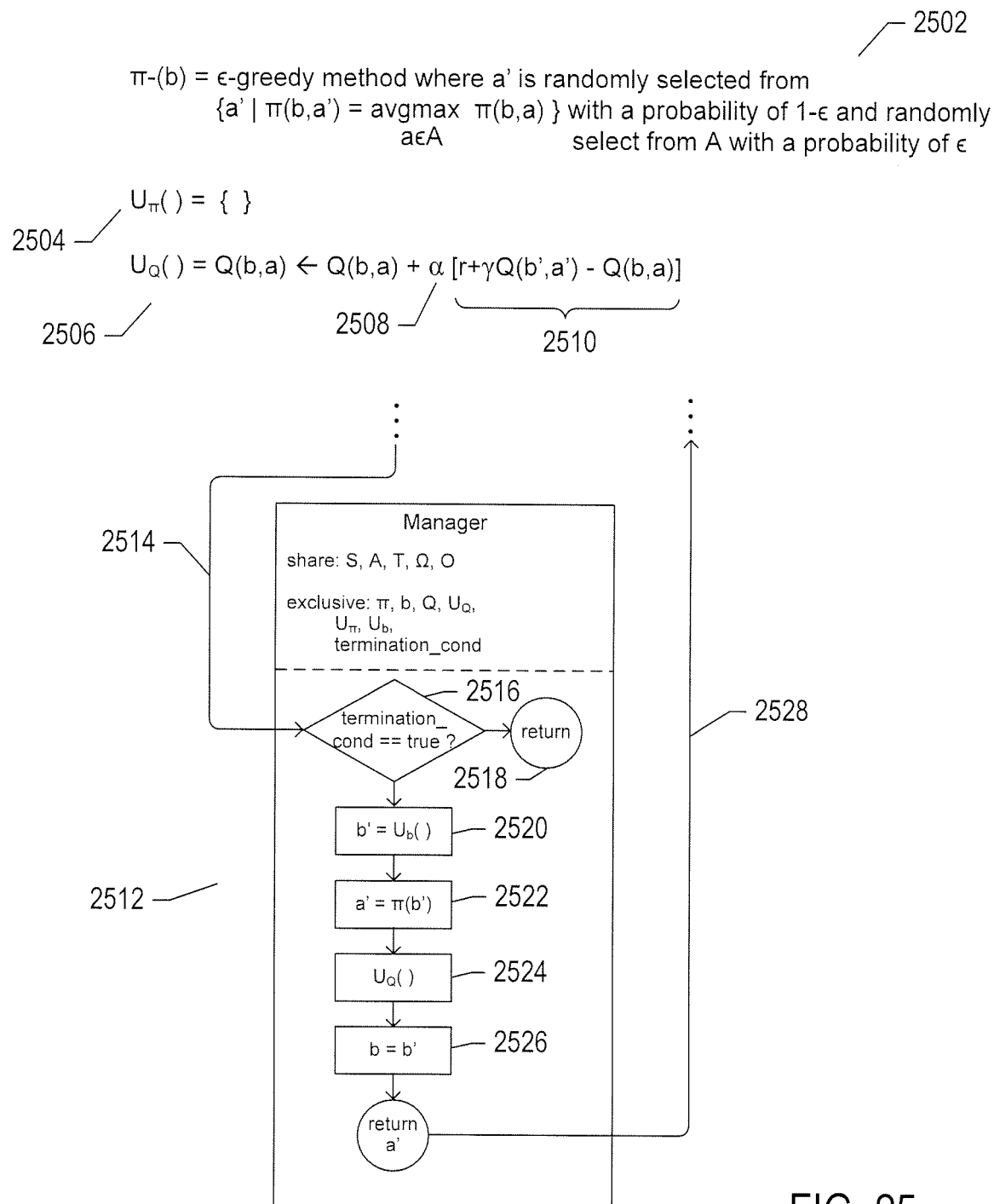

π-(b) = ε-greedy method where a' is randomly selected from
{a' | π(b,a') = avgmax π(b,a) } with a probability of 1-ε and randomly
    a∈A                          select from A with a probability of ε

$U_\pi() = \{\ \}$ $U_Q() = Q(b,a) \leftarrow Q(b,a) + \alpha\ [r+\gamma Q(b',a') - Q(b,a)]$ $Q_t(b,a)$ is a function of n parameters, $\theta_t$ $\theta_{t+1} = \theta_t + \alpha[Q_t(b,a) - Q_t^E(b,a)]\ \nabla_{\theta_t} Q_t(b,a)$, where $Q_t^E(b,a)$ is an estimate of $Q_t(b,a)$ based on r, γQ(b',A'), etc.

FIG. 25

```
if (d[m] > threshold1                              ⎯ 2904
{
        while ((a[n] > max) a[n] = a[n]/2;
}
                                                   ⎯ 2906
if ((o'[w] > o'[x] && (o[y] > threshold2) a[p] = o';

if ((o'[w] = o') || (o'[v] = o')) a = NULL;
                                                   ⎯ 2906
```

SAFE-OPERATION-CONSTRAINED REINFORCEMENT-LEARNING-BASED APPLICATION MANAGER

CROSS-REFERENCE TO RELATED APPLICATIONS

This application is a continuation-in-part of application Ser. No. 16/261,253, filed Jan. 29, 2019, which claims the benefit of Provisional Application No. 62/723,388, filed Aug. 27, 2018.

TECHNICAL FIELD

The current document is directed to standalone, networked, and distributed computer systems and to system management and, in particular, to a reinforcement-learning-based application manager that may run within a variety of different environments to safely control the configuration and operational behavior of applications.

BACKGROUND

During the past seven decades, electronic computing has evolved from primitive, vacuum-tube-based computer systems, initially developed during the 1940s, to modern electronic computing systems in which large numbers of multiprocessor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management and control systems related to distributed computing systems are seeking alternative design-and-implementation methodologies, including machine-learning-based approaches. The application of machine-learning technologies to the management of complex computational environments is still in early stages, but promises to expand the practically achievable feature sets of automated administration-and-management systems, decrease development costs, and provide a basis for more effective optimization Of course, administration-and-management control systems developed for distributed computer systems can often be applied to administer and manage standalone computer systems and individual, networked computer systems.

SUMMARY

The current document is directed to a safe-operation-constrained reinforcement-learning-based application manager that can be deployed in various different computational environments, without extensive manual modification and interface development, to manage the computational environments with respect to one or more reward-specified goals. Control actions undertaken by the safe-operation-constrained reinforcement-learning-based application manager are constrained, by stored action filters, to constrain state/action-space exploration by the safe-operation-constrained reinforcement-learning-based application manager to safe actions and thus prevent deleterious impact to the managed computational environment.

BRIEF DESCRIPTION OF THE DRAWINGS

In FIG. 9, three different physical data centers 902-904 are shown below planes representing the cloud-director layer of abstraction 906-908.

FIG. 17 provides additional details about the operation of the manager, environment, and universe.

FIG. 25 illustrates one implementation of a reinforcement-learning-based application manager that employs state/action-space exploration via the above-discussed $\epsilon$-greedy policy.

FIG. 29 illustrates a second type of application-vector filter.

DETAILED DESCRIPTION

Figure 1:
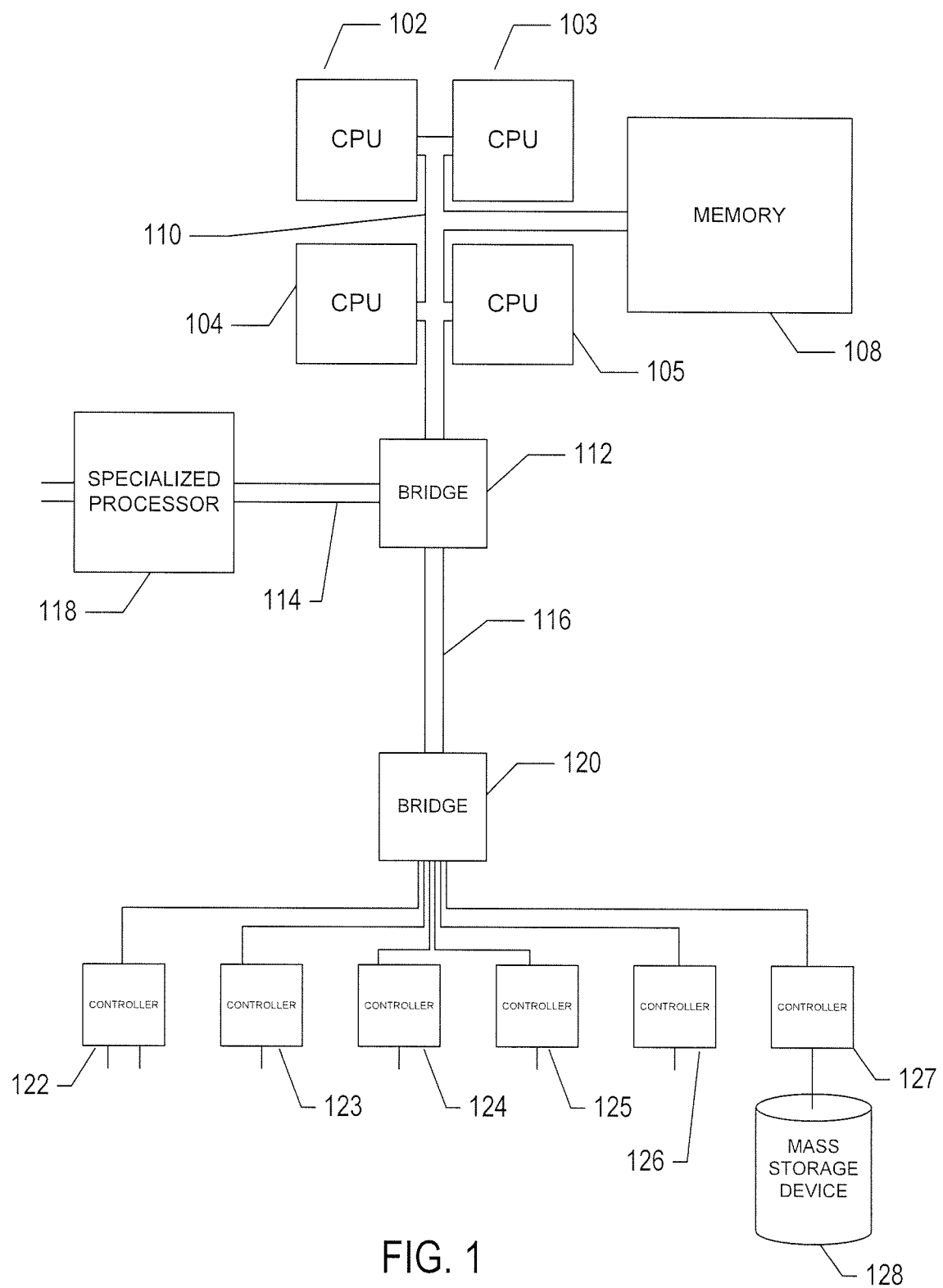
FIG. 1 provides a general architectural diagram for various types of computers.

The current document is directed to a safe-operation-constrained reinforcement-learning-based application manager. In a first subsection, below, a detailed description of computer hardware, complex computational systems, and virtualization is provided with reference to FIGS. 1-11. In a second subsection, application management and reinforcement learning are discussed with reference to FIGS. 11-20. In a third subsection, implementations of the currently disclosed safe-operation-constrained reinforcement-learning application manager are introduced and described with reference to FIGS. 21-35.

Computer Hardware, Complex Computational Systems, Virtualization, and Generation of Status, Informational, and Error Data The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
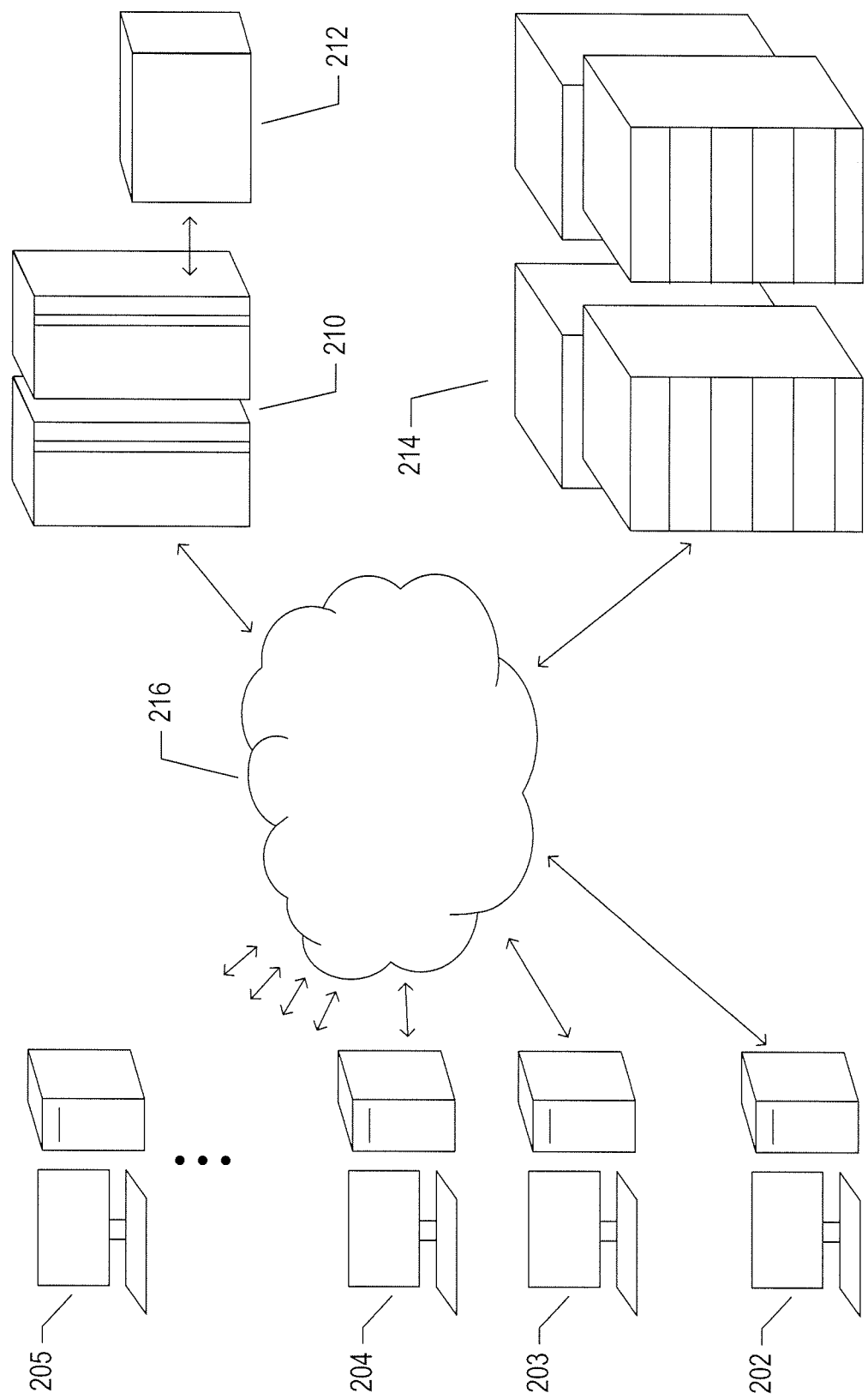
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
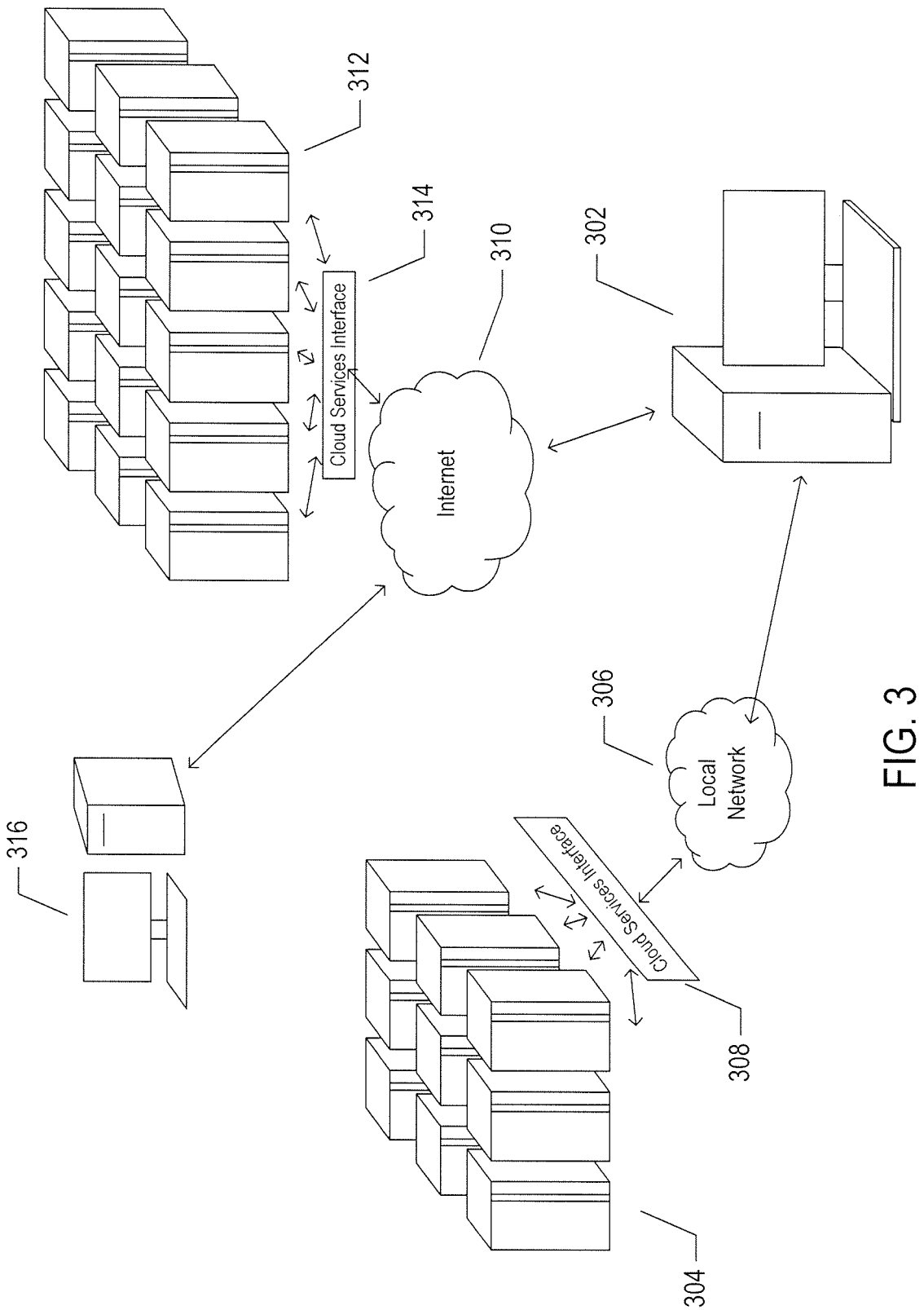
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
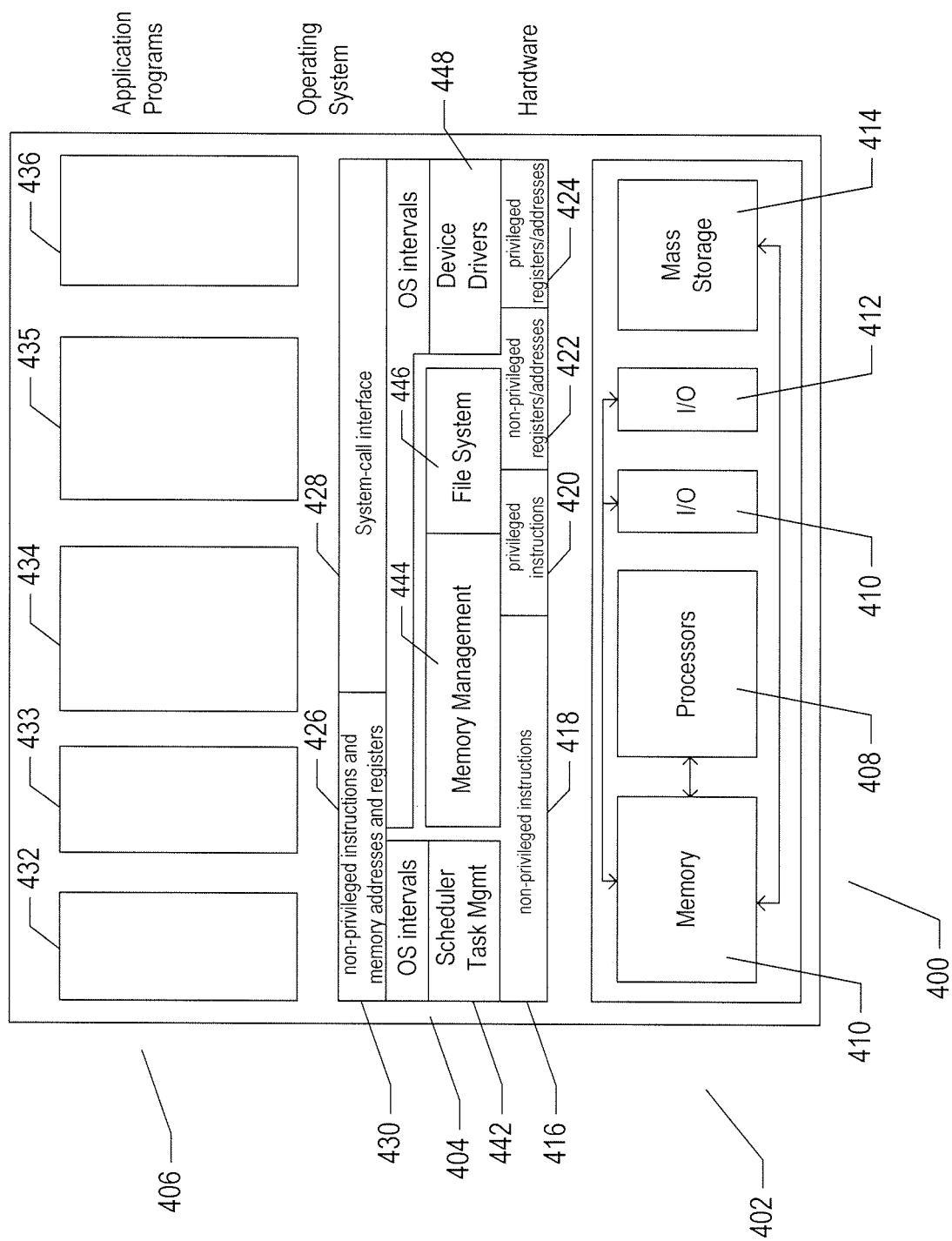
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
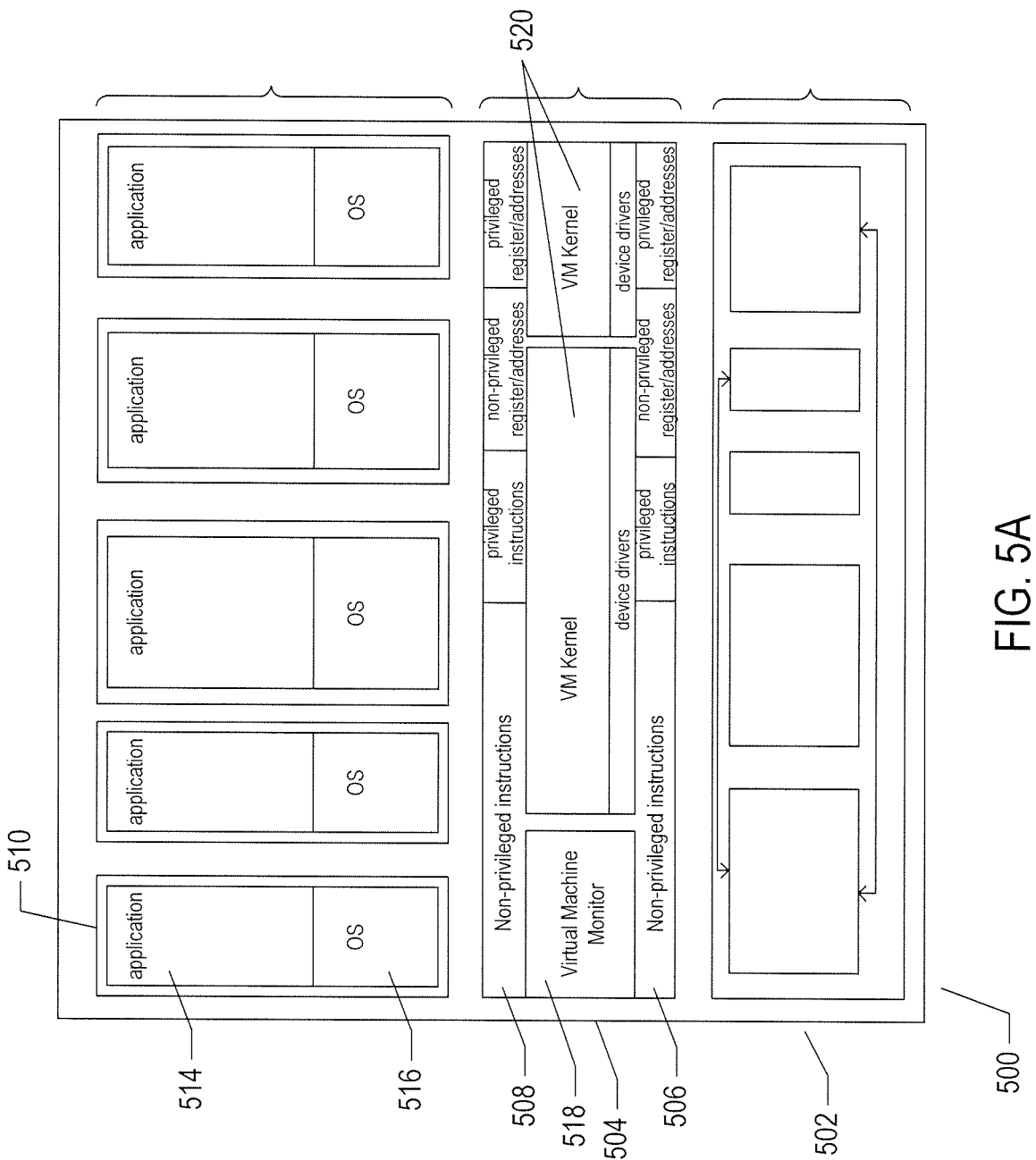
FIGS. 5A-B illustrate two types of virtual machine and virtual-machine execution environments.
Figure 5B:
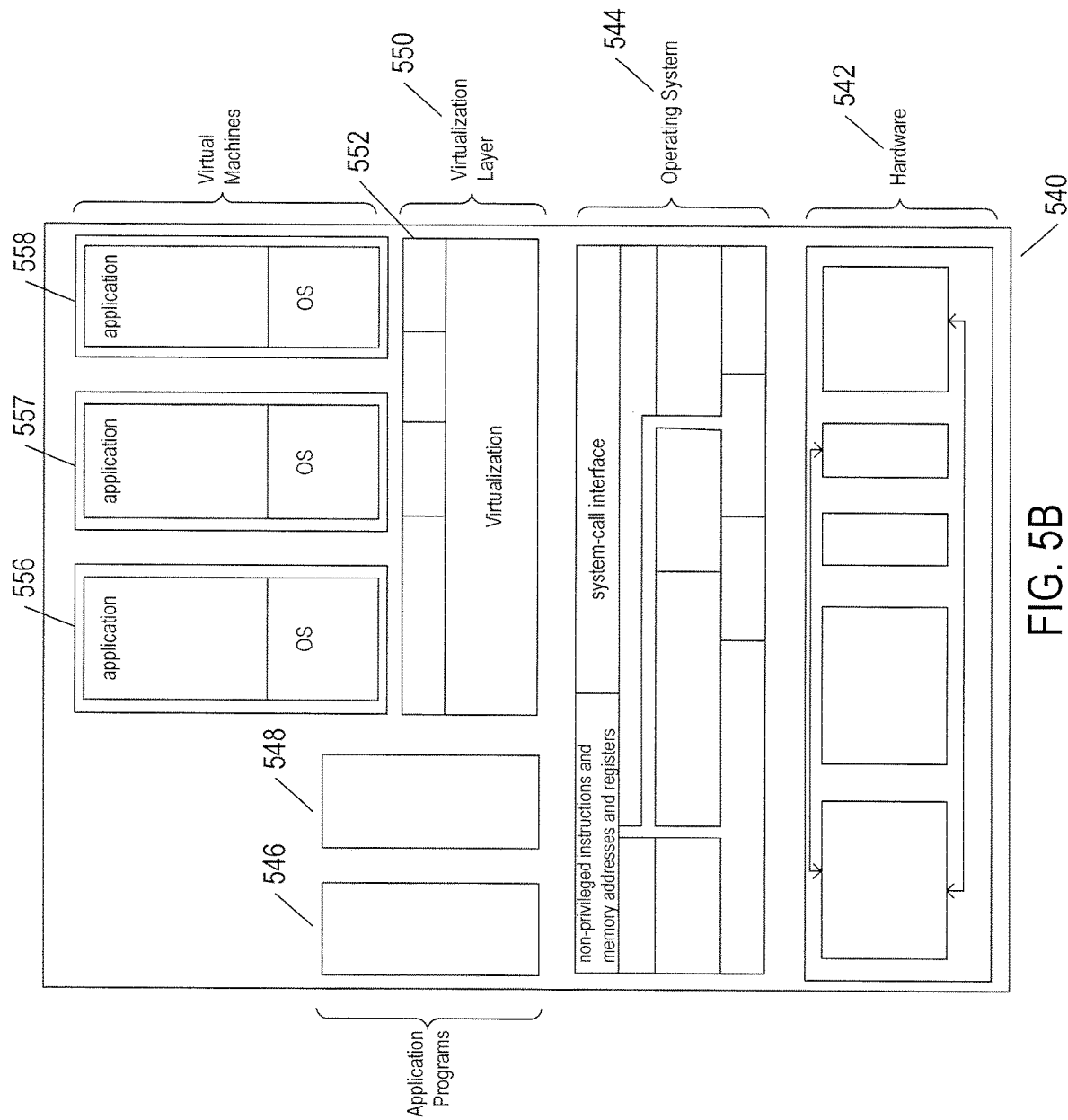

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
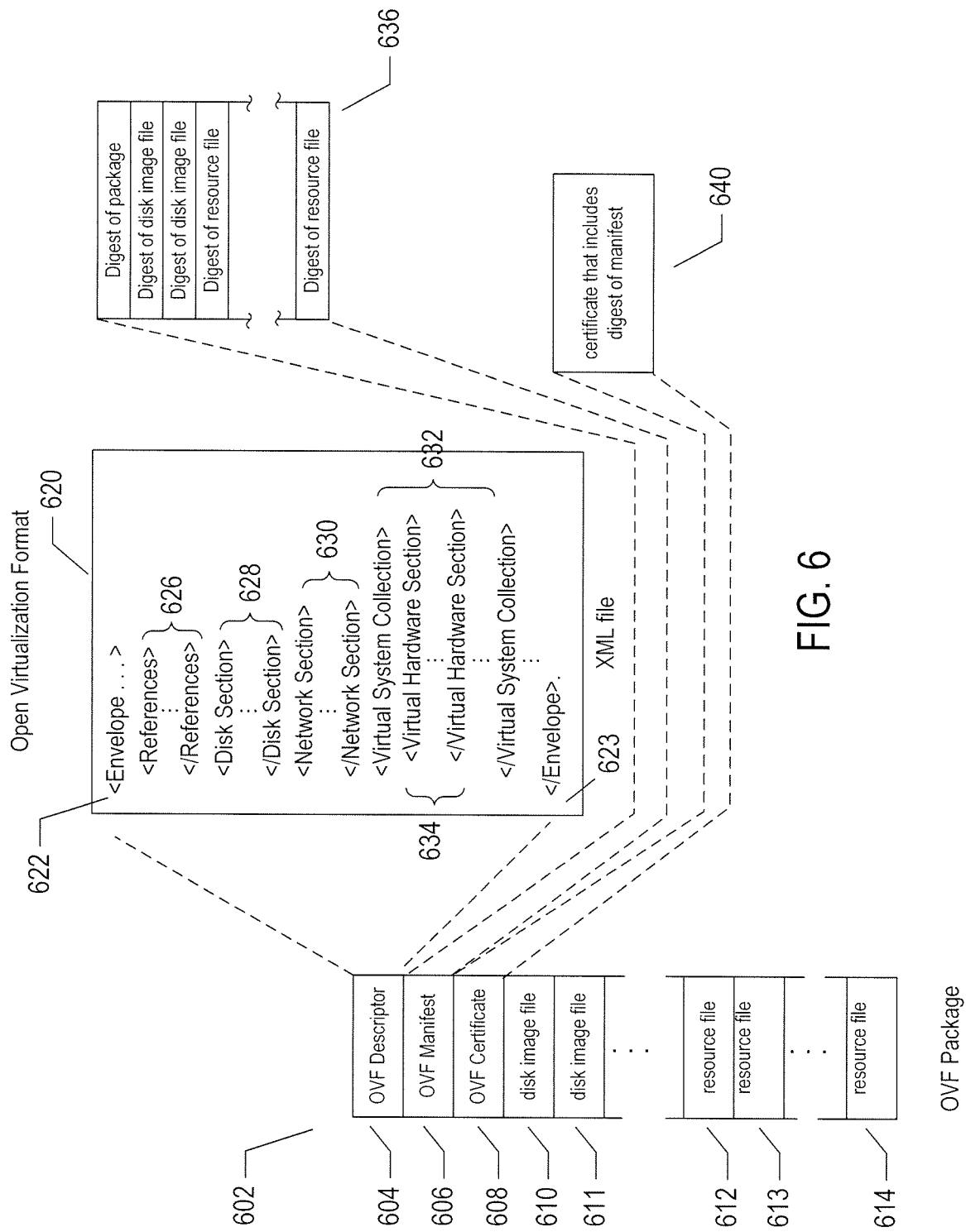
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
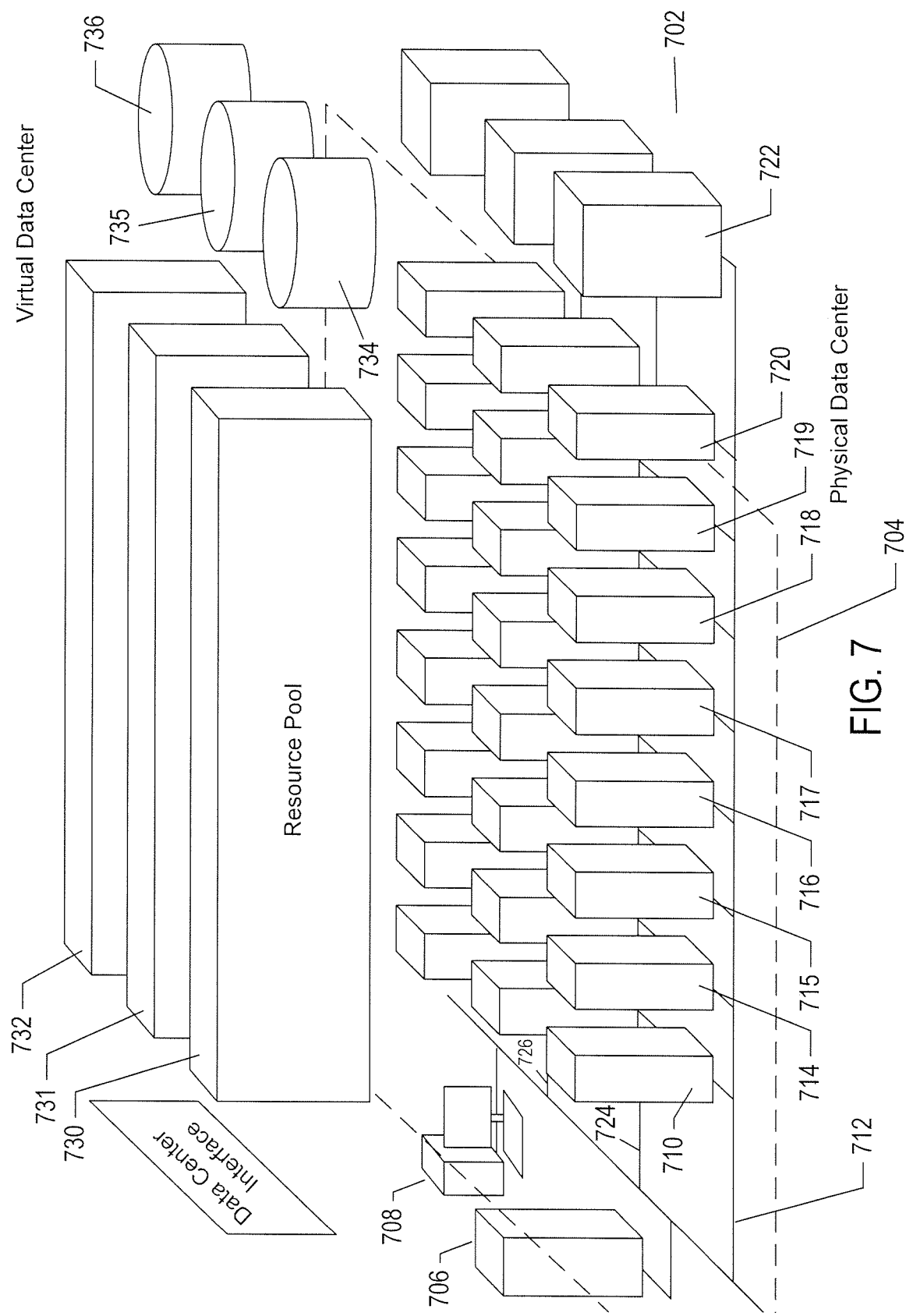
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
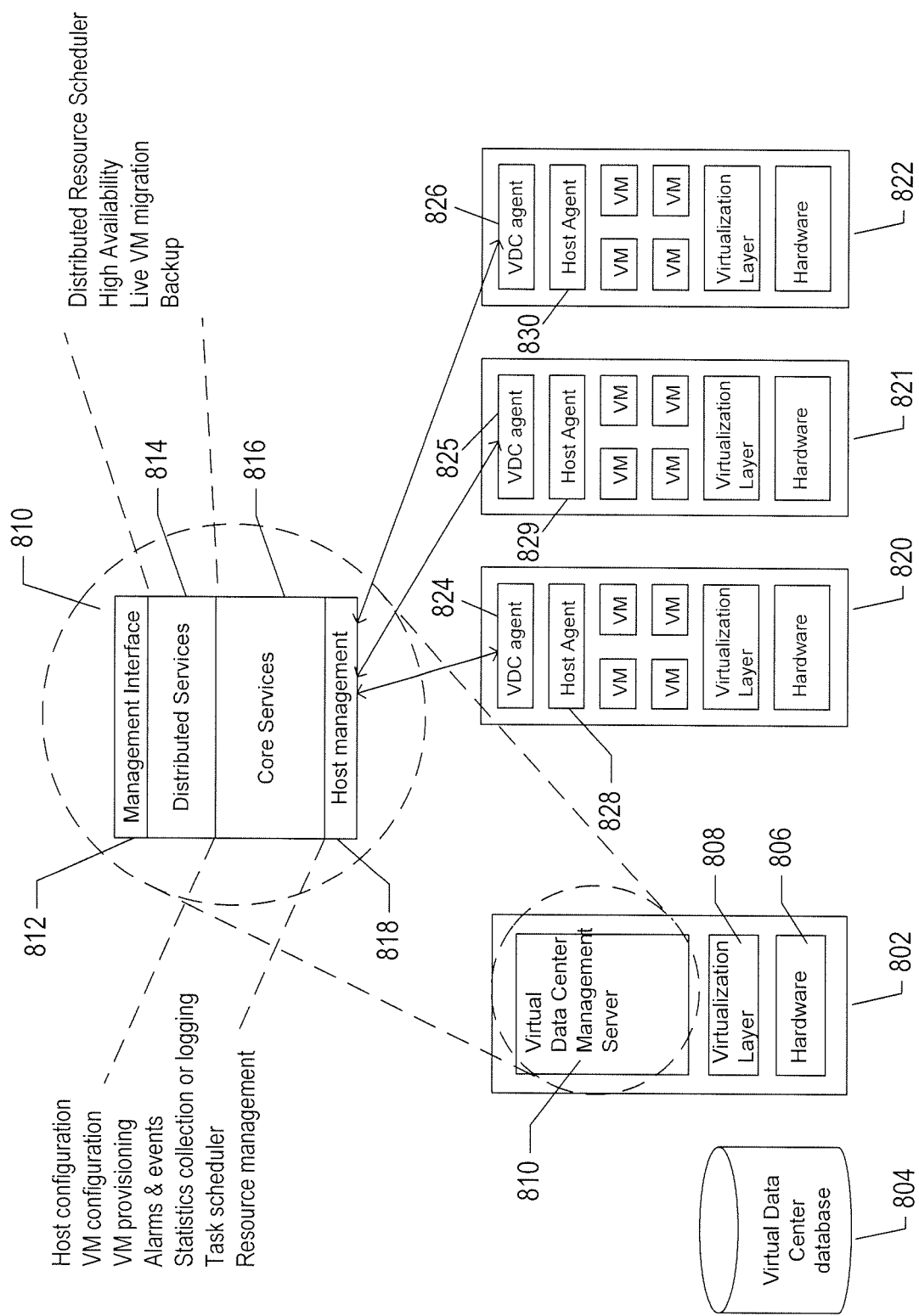
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
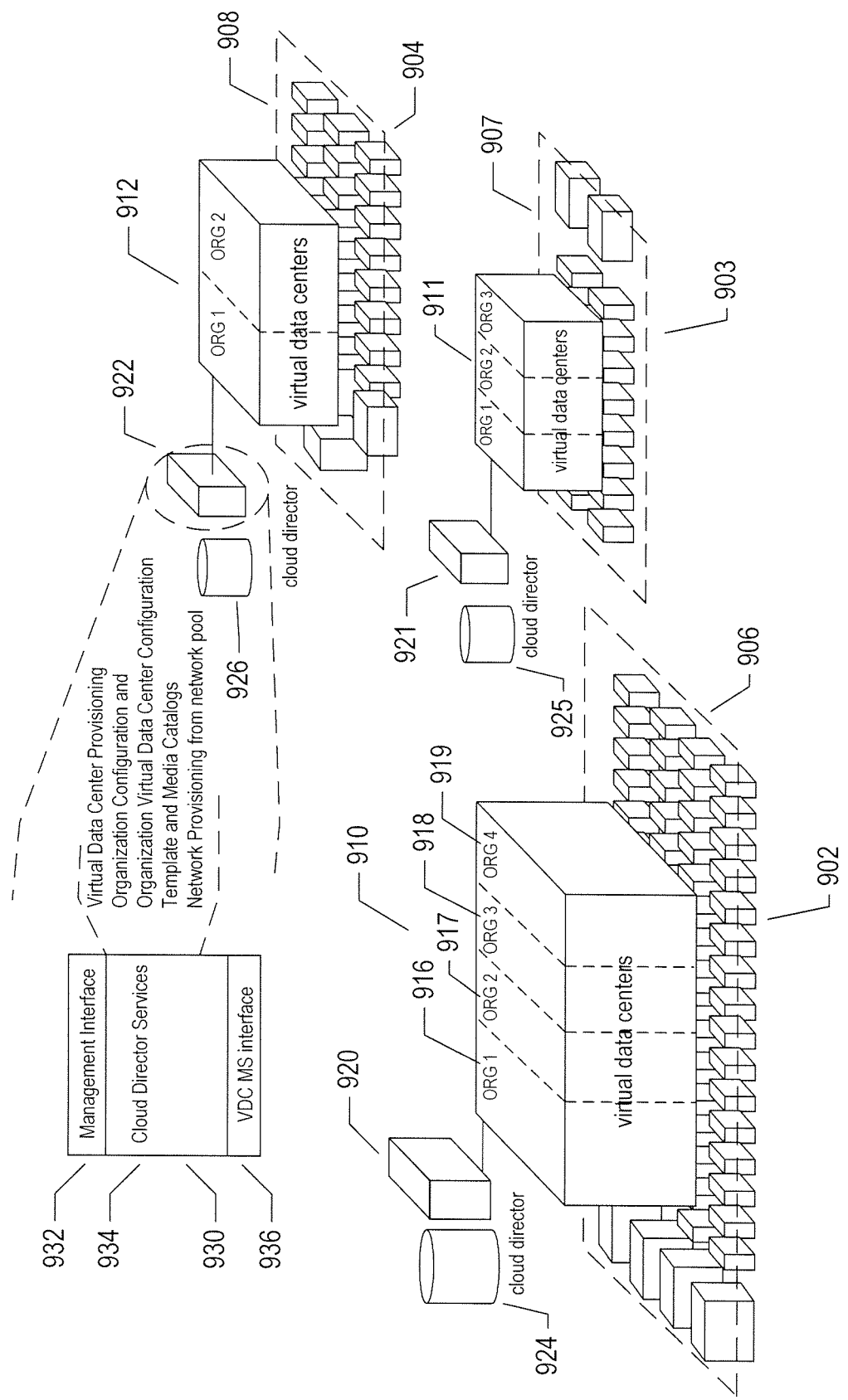
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
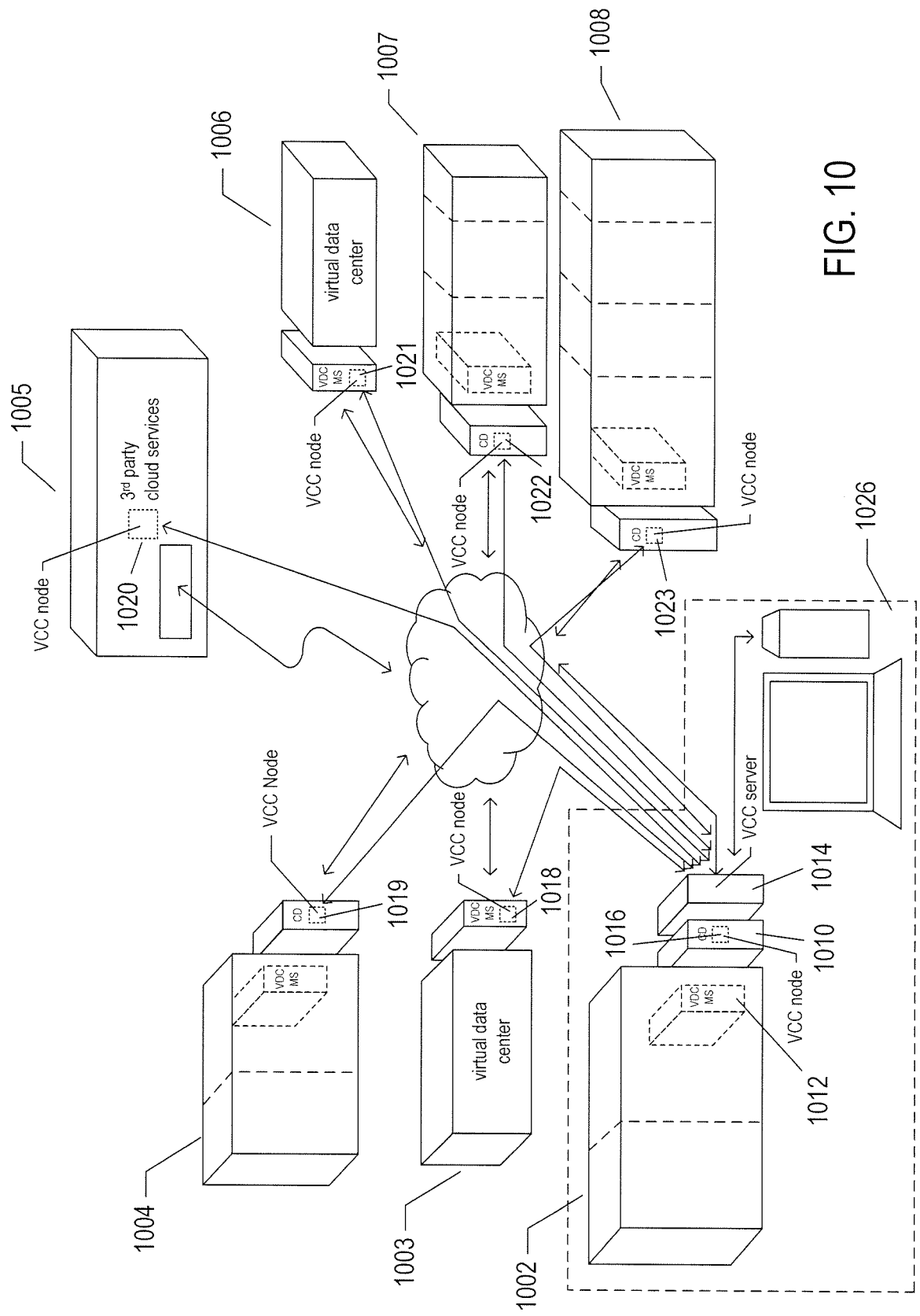
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Application Management and Reinforcement Learning

Figure 11A:
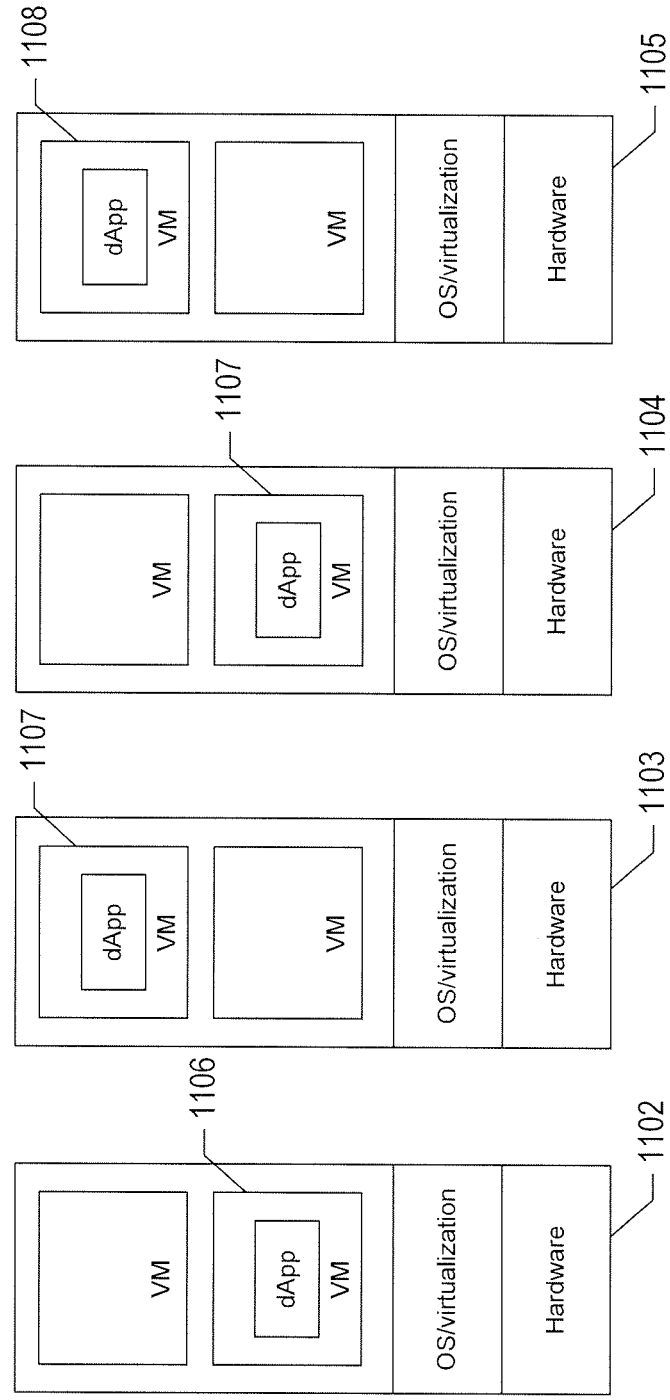
FIGS. 11A-C illustrate an application manager.
Figure 11B:
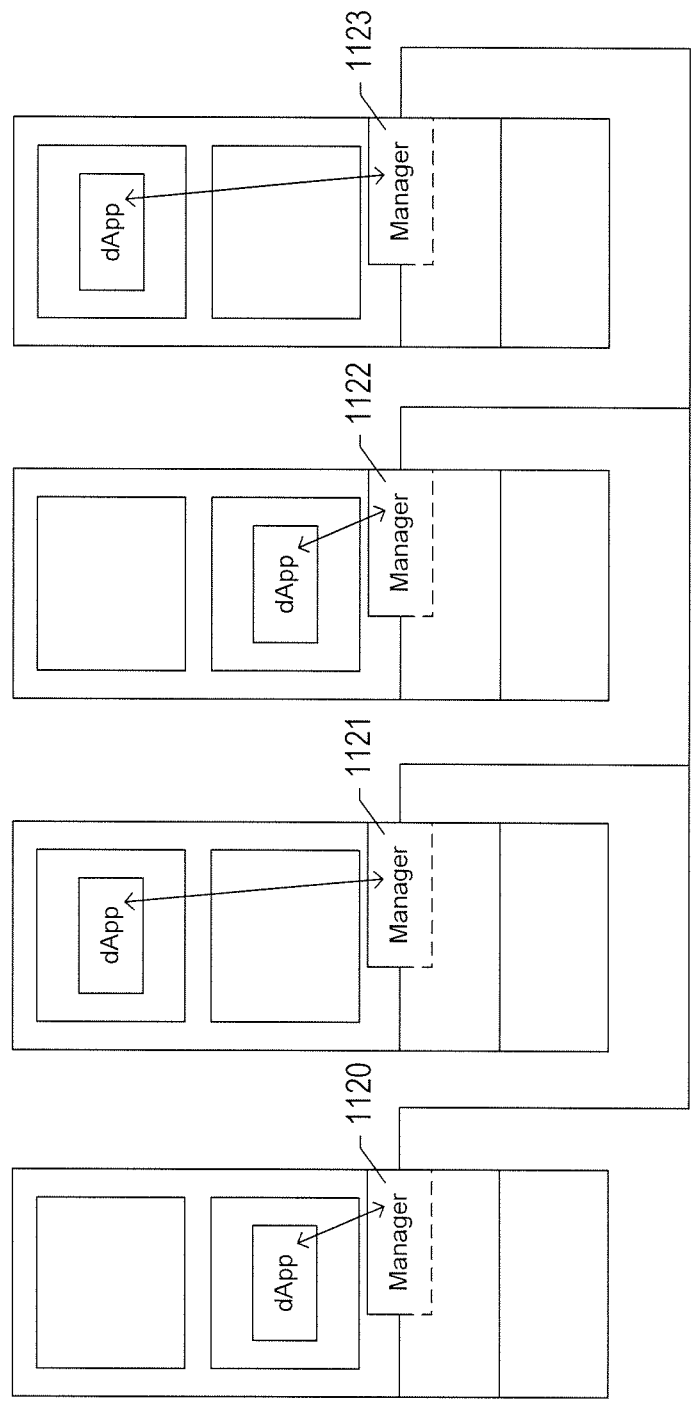
Figure 11C:
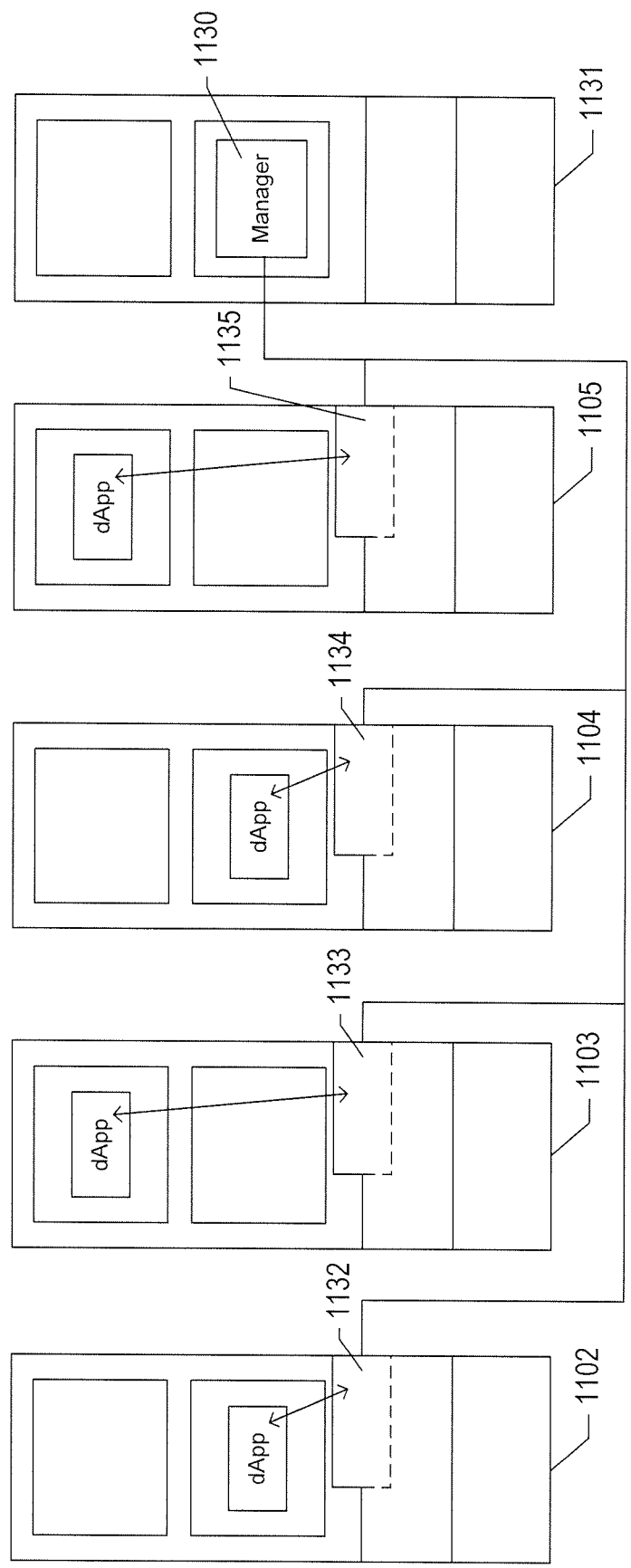

FIGS. 11A-C illustrate an application manager. All three figures use the same illustration conventions, next described with reference to FIG. 11A. The distributed computing system is represented, in FIG. 11A, by four servers 1102-1105 that each support execution of a virtual machine, 1106-1108 respectively, that provides an execution environment for a local instance of the distributed application. Of course, in real-life cloud-computing environments, a particular distributed application may run on many tens to hundreds of individual physical servers. Such distributed applications often require fairly continuous administration and management. For example, instances of the distributed application may need to be launched or terminated, depending on current computational loads, and may be frequently relocated to different physical servers and even to different cloud-computing facilities in order to take advantage of favorable pricing for virtual-machine execution, to obtain necessary computational throughput, and to minimize networking latencies. Initially, management of distributed applications as well as the management of multiple, different applications executing on behalf of a client or client organization of one or more cloud-computing facilities was carried out manually through various management interfaces provided by cloud-computing facilities and distributed-computer data centers. However, as the complexity of distributed-computing environments has increased and as the numbers and complexities of applications concurrently executed by clients and client organizations have increased, efforts have been undertaken to develop automated application managers for automatically monitoring and managing applications on behalf of clients and client organizations of cloud-computing facilities and distributed-computer-system-based data centers.

As shown in FIG. 11B, one approach to automated management of applications within distributed computer systems is to include, in each physical server on which one or more of the managed applications executes, a local instance of the distributed application manager 1120-1123. The local instances of the distributed application manager cooperate, in peer-to-peer fashion, to manage a set of one or more applications, including distributed applications, on behalf of a client or client organization of the data center or cloud-computing facility. Another approach, as shown in FIG. 11C, is to run a centralized or centralized-distributed application manager 1130 on one or more physical servers 1131 that communicates with application-manager agents 1132-1135 on the servers 1102-1105 to support control and management of the managed applications. In certain cases, application-management facilities may be incorporated within the various types of management servers that manage virtual data centers and aggregations of virtual data centers discussed in the previous subsection of the current document. The phrase "application manager" means, in this document, an automated controller than controls and manages applications programs and the computational environment in which they execute. Thus, an application manager may interface to one or more operating systems and virtualization layers, in addition to applications, in various implementations, to control and manage the applications and their computational environments. In certain implementations, an application manager may even control and manage virtual and/or physical components that support the computational environments in which applications execute.

In certain implementations, an application manager is configured to manage applications and their computational environments within one or more distributed computing systems based on a set of one or more policies, each of which may include various rules, parameter values, and other types of specifications of the desired operational characteristics of the applications. As one example, the one or more policies may specify maximum average latencies for responding to user requests, maximum costs for executing virtual machines per hour or per day, and policy-driven approaches to optimizing the cost per transaction and the number of transactions carried out per unit of time. Such overall policies may be implemented by a combination of finer-grain policies, parameterized control programs, and other types of controllers that interface to operating-system and virtualization-layer-management subsystems. However, as the numbers and complexities of applications desired to be managed on behalf of clients and client organizations of data centers and cloud-computing facilities continues to increase, it is becoming increasingly difficult, if not practically impossible, to implement policy-driven application management by manual programming and/or policy construction. As a result, a new approach to application management based on the machine-learning technique referred to as "reinforcement learning" has been undertaken.

Figure 12:
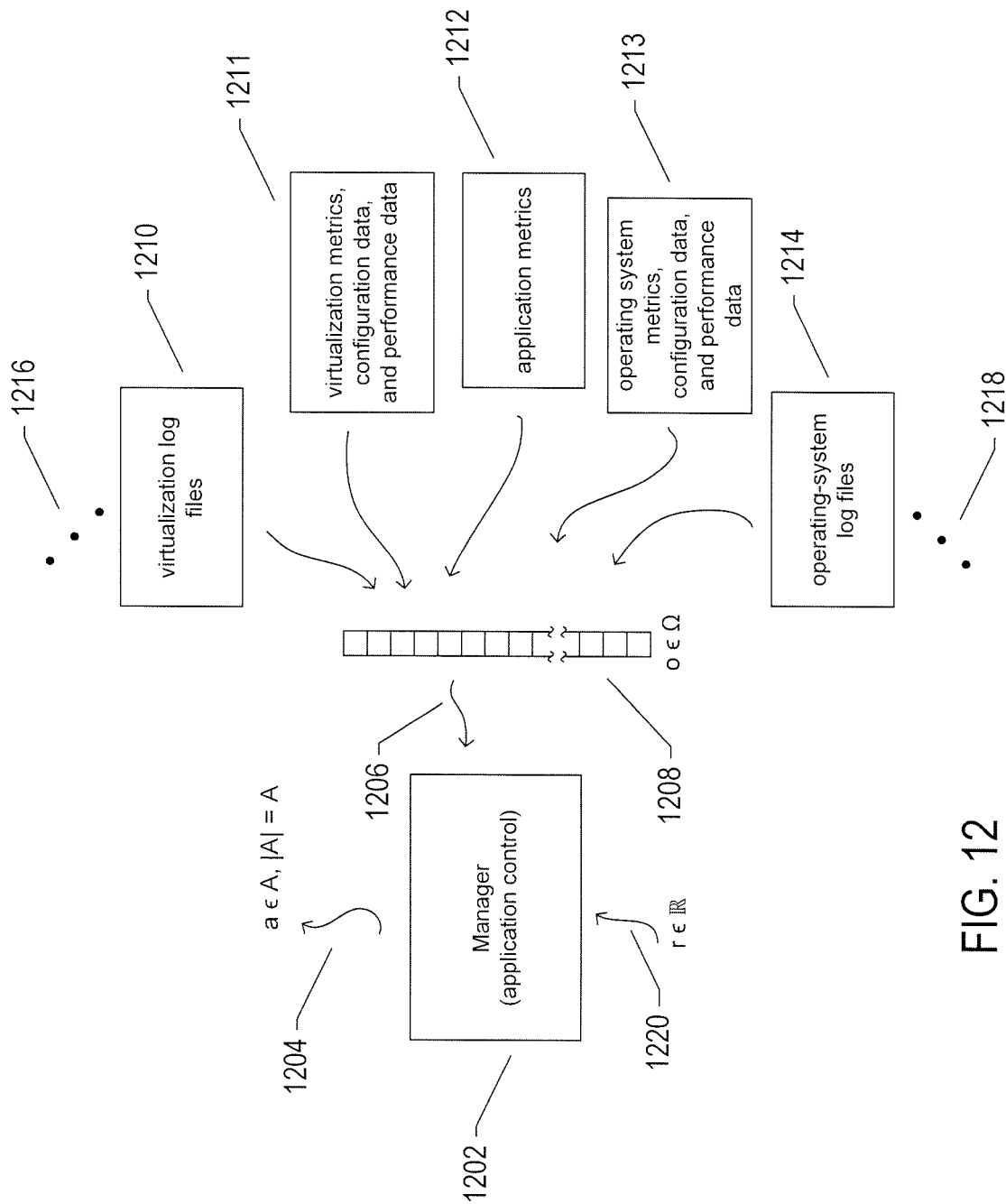
FIG. 12 illustrates, at a high level of abstraction, a reinforcement-learning-based application manager controlling a computational environment, such as a cloud-computing facility.

FIG. 12 illustrates, at a high level of abstraction, a reinforcement-learning-based application manager controlling a computational environment, such as a cloud-computing facility. The reinforcement-learning-based application manager 1202 manages one or more applications by emitting or issuing actions, as indicated by arrow 1204. These actions are selected from a set of actions A of cardinality |A|. Each action a in the set of actions A can be generally thought of as a vector of numeric values that specifies an operation that the manager is directing the environment to carry out. The environment may, in many cases, translate the action into one or more environment-specific operations that can be carried out by the computational environment controlled by the reinforcement-learning-based application manager. It should be noted that the cardinality |A| may be indeterminable, since the numeric values may include real values, and the action space may be therefore effectively continuous or effectively continuous in certain dimensions. The operations represented by actions may be, for example, commands, including command arguments, executed by operating systems, distributed operating systems, virtualization layers, management servers, and other types of control components and subsystems within one or more distributed computing systems or cloud-computing facilities. The reinforcement-learning-based application manager receives observations from the computational environment, as indicated by arrow 1206. Each observation o can be thought of as a vector of numeric values 1208 selected from a set of possible observation vectors Ω. The set Ω may, of course, be quite large and even practically innumerable. Each element of the observation o represents, in certain implementations, a particular type of metric or observed operational characteristic or parameter, numerically encoded, that is related to the computational environment. The metrics may have discrete values or real values, in various implementations. For example, the metrics or observed operational characteristics may indicate the amount of memory allocated for applications and/or application instances, networking latencies experienced by one or more applications, an indication of the number of instruction-execution cycles carried out on behalf of applications or local-application instances, and many other types of metrics and operational characteristics of the managed applications and the computational environment in which the managed applications run. As shown in FIG. 12, there are many different sources 1210-1214 for the values included in an observation o, including virtualization-layer and operating-system log files 1210 and 1214, virtualization-layer metrics, configuration data, and performance data provided through a virtualization-layer management interface 1211, various types of metrics generated by the managed applications 1212, and operating-system metrics, configuration data, and performance data 1213. Ellipses 1216 and 1218 indicate that there may be many additional sources for observation values. In addition to receiving observation vectors o, the reinforcement-learning-based application manager receives rewards, as indicated by arrow 1220. Each reward is a numeric value that represents the feedback provided by the computational environment to the reinforcement-learning-based application manager after carrying out the most recent action issued by the manager and transitioning to a resultant state, as further discussed below. The reinforcement-learning-based application manager is generally initialized with an initial policy that specifies the actions to be issued in response to received observations and over time, as the application manager interacts with the environment, the application manager adjusts the internally maintained policy according to the rewards received following issuance of each action. In many cases, after a reasonable period of time, a reinforcement-learning-based application manager is able to learn a near-optimal or optimal policy for the environment, such as a set of distributed applications, that it manages. In addition, in the case that the managed environment evolves over time, a reinforcement-learning-based application manager is able to continue to adjust the internally maintained policy in order to track evolution of the managed environment so that, at any given point in time, the internally maintained policy is near-optimal or optimal. In the case of an application manager, the computational environment in which the applications run may evolve through changes to the configuration and components, changes in the computational load experienced by the applications and computational environment, and as a result of many additional changes and forces. The received observations provide the information regarding the managed environment that allows the reinforcement-learning-based application manager to infer the current state of the environment which, in turn, allows the reinforcement-learning-based application manager to issue actions that push the managed environment towards states that, over time, produce the greatest reward feedbacks. Of course, similar reinforcement-learning-based application managers may be employed within standalone computer systems, individual, networked computer systems, various processor-controlled devices, including smart phones, and other devices and systems that run applications.

Figure 13:
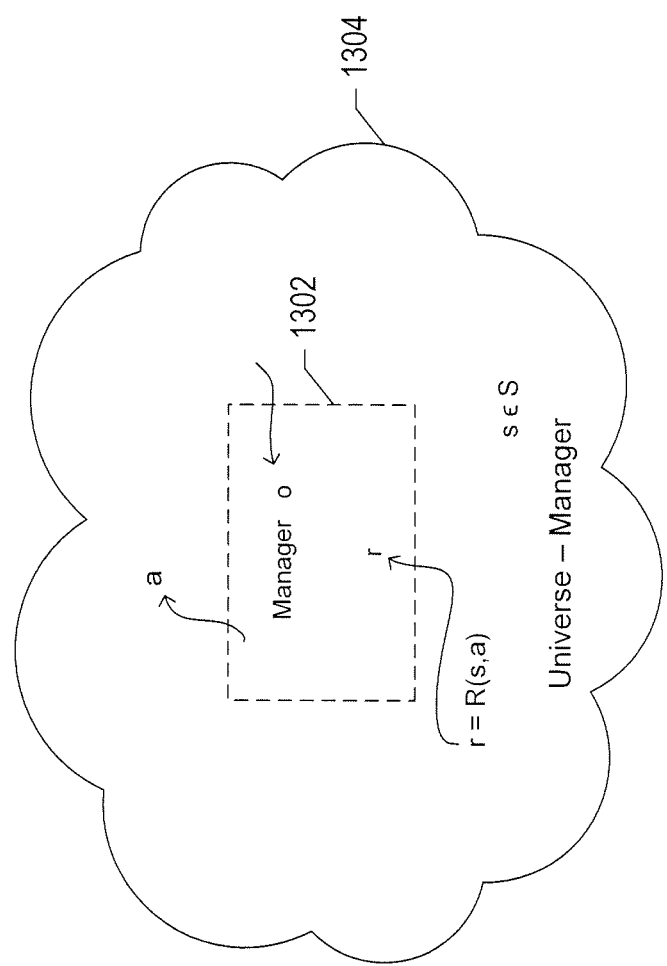
FIG. 13 summarizes the reinforcement-learning-based approach to control.

FIG. 13 summarizes the reinforcement-learning-based approach to control. The manager or controller 1302, referred to as a "reinforcement-learning agent," is contained within, but is distinct and separate from, the universe 1304. Thus, the universe comprises the manager or controller 1302 and the portion of the universe not included in the manager, in set notation referred to as "universe—manager." In the current document, the portion of the universe not included in the manager is referred to as the "environment." In the case of an application manager, the environment includes the managed applications, the physical computational facilities in which they execute, and even generally includes the physical computational facilities in which the manager executes. The rewards are generated by the environment and the reward-generation mechanism cannot be controlled or modified by the manager.

Figure 14A:
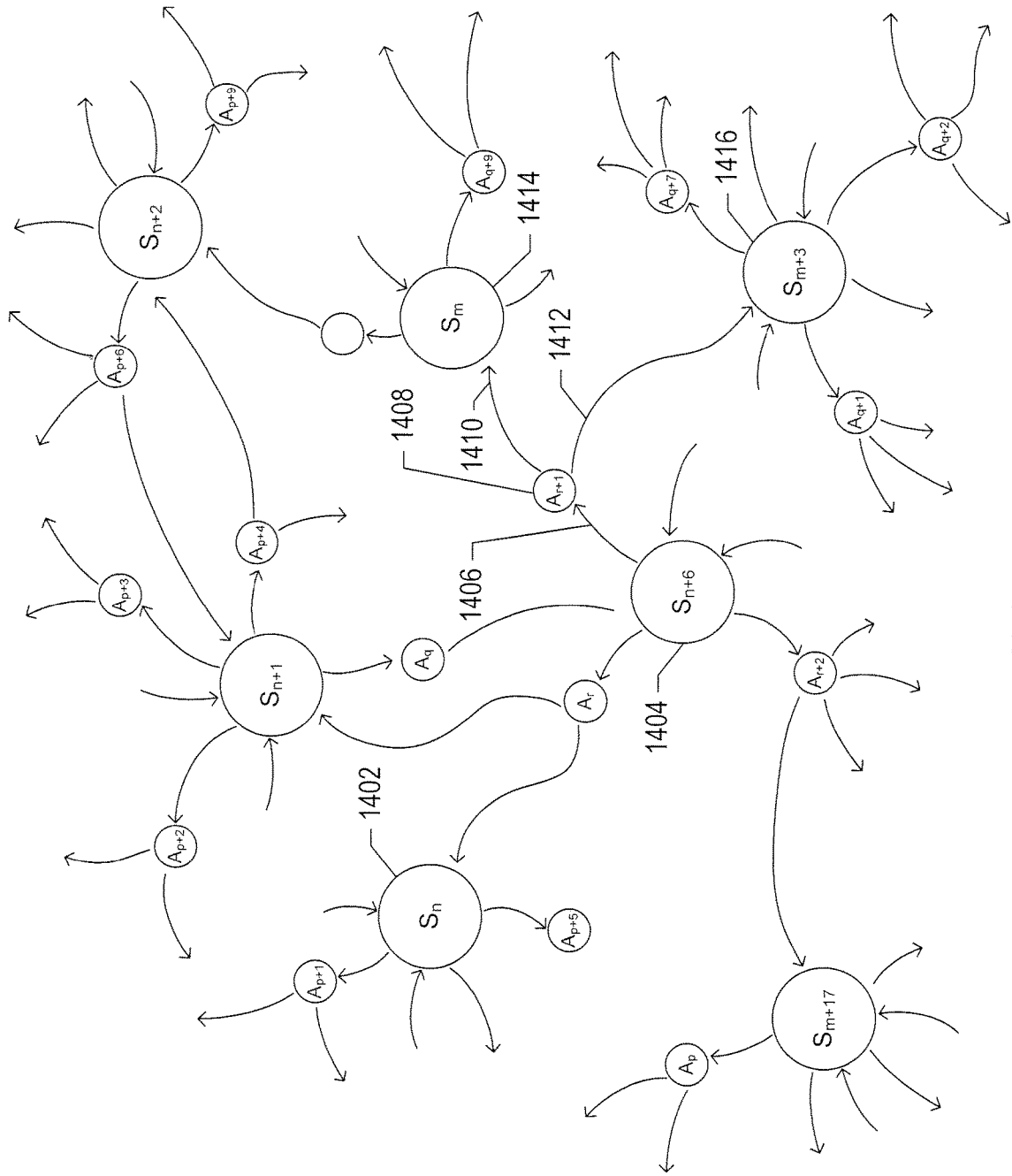
FIGS. 14A-B illustrate states of the environment.
Figure 14B:
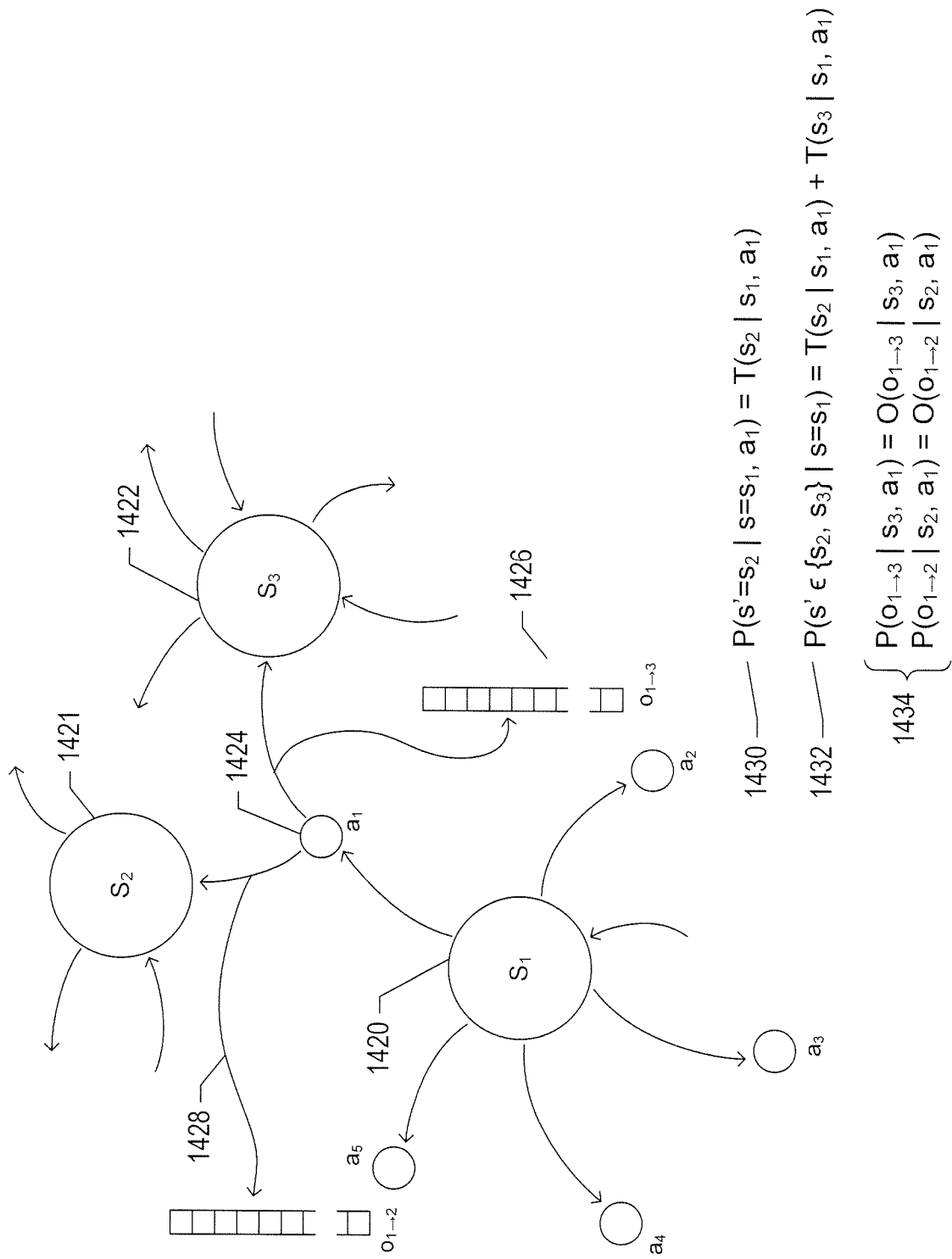

FIGS. 14A-B illustrate states of the environment. In the reinforcement-learning approach, the environment is considered to inhabit a particular state at each point in time. The state may be represented by one or more numeric values or character-string values, but generally is a function of hundreds, thousands, millions, or more different variables. The observations generated by the environment and transmitted to the manager reflect the state of the environment at the time that the observations are made. The possible state transitions can be described by a state-transition diagram for the environment. FIG. 14A illustrates a portion of a state-transition diagram. Each of the states in the portion of the state-transition diagram shown in FIG. 14A are represented by large, labeled disks, such as disc 1402 representing a particular state $S_n$. The transition between one state to another state occurs as a result of an action, emitted by the manager, that is carried out within the environment. Thus, arrows incoming to a given state represent transitions from other states to the given state and arrows outgoing from the given state represent transitions from the given state to other states. For example, one transition from state 1404, labeled $S_{n+6}$, is represented by outgoing arrow 1406. The head of this arrow points to a smaller disc that represents a particular action 1408. This action node is labeled $A_{r+1}$. The labels for the states and actions may have many different forms, in different types of illustrations, but are essentially unique identifiers for the corresponding states and actions. The fact that outgoing arrow 1406 terminates in action 1408 indicates that transition 1406 occurs upon carrying out of action 1408 within the environment when the environment is in state 1404. Outgoing arrows 1410 and 1412 emitted by action node 1408 terminate at states 1414 and 1416, respectively. These arrows indicate that carrying out of action 1408 by the environment when the environment is in state 1404 results in a transition either to state 1414 or to state 1416. It should also be noted that an arrow emitted from an action node may return to the state from which the outgoing arrow to the action node was emitted. In other words, carrying out of certain actions by the environment when the environment is in a particular state may result in the environment maintaining that state. Starting at an initial state, the state-transition diagram indicates all possible sequences of state transitions that may occur within the environment. Each possible sequence of state transitions is referred to as a "trajectory."

FIG. 14B illustrates additional details about state-transition diagrams and environmental states and behaviors. FIG. 14B shows a small portion of a state-transition diagram that includes three state nodes 1420-1422. A first additional detail is the fact that, once an action is carried out, the transition from the action node to a resultant state is accompanied by the emission of an observation, by the environment, to the manager. For example, a transition from state 1420 to state 1422 as a result of action 1424 produces observation 1426, while transition from state 1420 to state 1421 via action 1424 produces observation 1428. A second additional detail is that each state transition is associated with a probability. Expression 1430 indicates that the probability of transitioning from state $s_1$ to state $s_2$ as a result of the environment carrying out action $a_1$, where s indicates the current state of the environment and s' indicates the next state of the environment following s, is output by the state-transition function T, which takes, as arguments, indications of the initial state, the final state, and the action. Thus, each transition from a first state through a particular action node to a second state is associated with a probability. The second expression 1432 indicates that probabilities are additive, so that the probability of a transition from state $s_1$ to either state $s_2$ or state $s_3$ as a result of the environment carrying out action $a_1$ is equal to the sum of the probability of a transition from state $s_1$ to state $s_2$ via action $a_1$ and the probability of a transition from state $s_1$ to state $s_3$ via action $a_1$. Of course, the sum of the probabilities associated with all of the outgoing arrows emanating from a particular state is equal to 1.0, for all non-terminal states, since, upon receiving an observation/reward pair following emission of a first action, the manager emits a next action unless the manager terminates. As indicated by expressions 1434, the function O returns the probability that a particular observation o is returned by the environment given a particular action and the state to which the environment transitions following execution of the action. In other words, in general, there are many possible observations o that might be generated by the environment following transition to a particular state through a particular action, and each possible observation is associated with a probability of occurrence of the observation given a particular state transition through a particular action.

Figure 15:
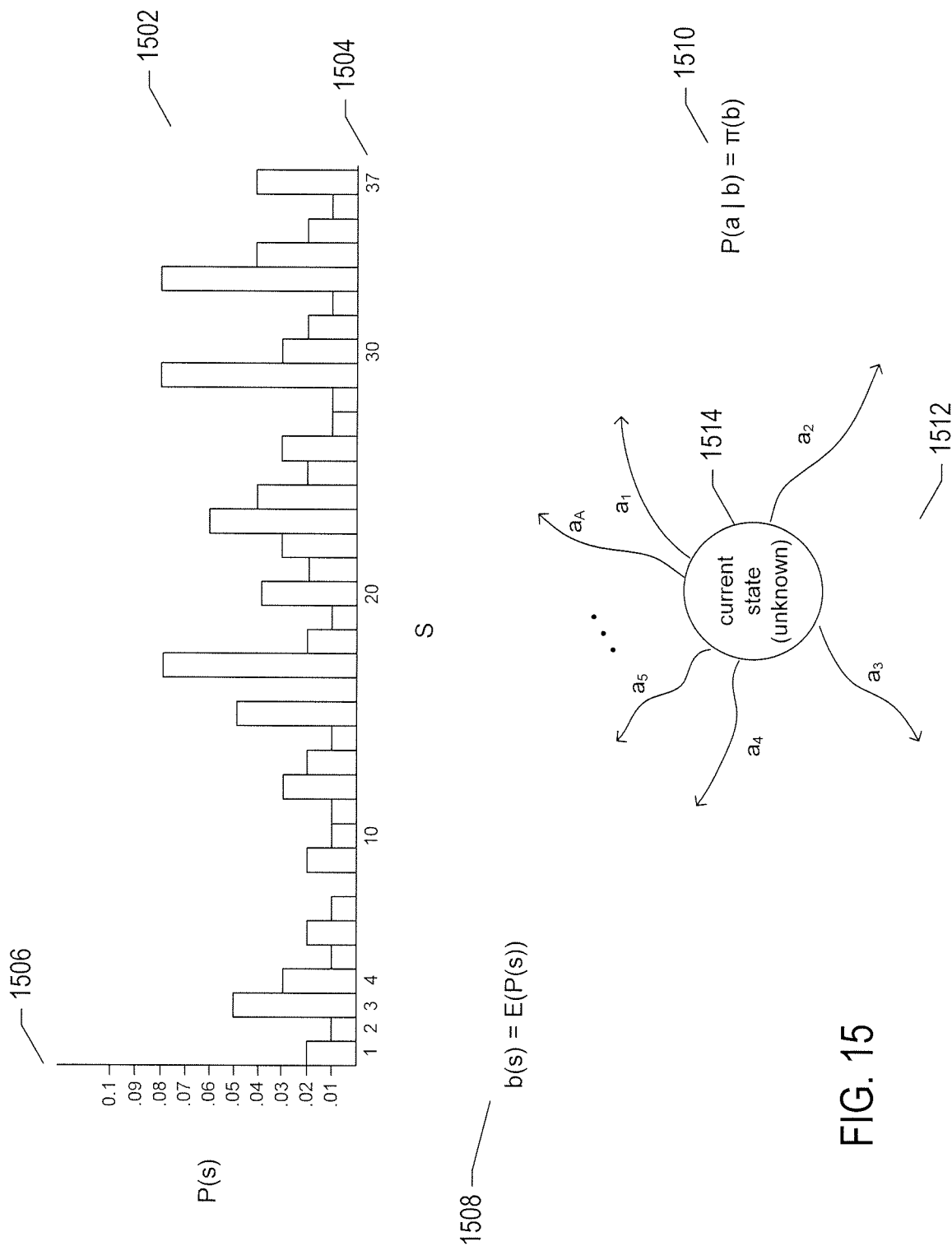
FIG. 15 illustrates the concept of belief.

FIG. 15 illustrates the concept of belief. At the top of FIG. 15, a histogram 1502 is shown. The horizontal axis 1502 represents 37 different possible states for a particular environment and the vertical axis 1506 represents the probability of the environment being in the corresponding state at some point in time. Because the environment must be in one state at any given point in time, the sum of the probabilities for all the states is equal to 1.0. Because the manager does not know the state of the environment, but instead only knows the values of the elements of the observation following the last executed action, the manager infers the probabilities of the environment being in each of the different possible states. The manager's belief b(s) is the expectation of the probability that the environment is in state s, as expressed by equation 1508. Thus, the belief b is a probability distribution which could be represented in a histogram similar to histogram 1502. Over time, the manager accumulates information regarding the current state of the environment and the probabilities of state transitions as a function of the belief distribution and most recent actions, as a result of which the probability distribution b shifts towards an increasingly non-uniform distribution with greater probabilities for the actual state of the environment. In a deterministic and fully observable environment, in which the manager knows the current state of the environment, the policy π maintained by the manager can be thought of as a function that returns the next action a to be emitted by the manager to the environment based on the current state of the environment, or, in mathematical notation, a=π(s). However, in the non-deterministic and non-transparent environment in which application managers operate, the policy π maintained by the manager determines a probability for each action based on the current belief distribution b, as indicated by expression 1510 in FIG. 15, and an action with the highest probability is selected by the policy π, which can be summarized, in more compact notation, by expression 1511. Thus, as indicated by the diagram of a state 1512, at any point in time, the manager does not generally certainly know the current state of the environment, as indicated by the label 1514 within the node representation of the current date 1512, as a result of which there is some probability, for each possible state, that the environment is currently in that state. This, in turn, generally implies that there is a non-zero probability that each of the possible actions that the manager can issue should be the next issued action, although there are cases in which, although the state of the environment is not known with certain, there is enough information about the state of the environment to allow a best action to be selected.

Figure 16A:
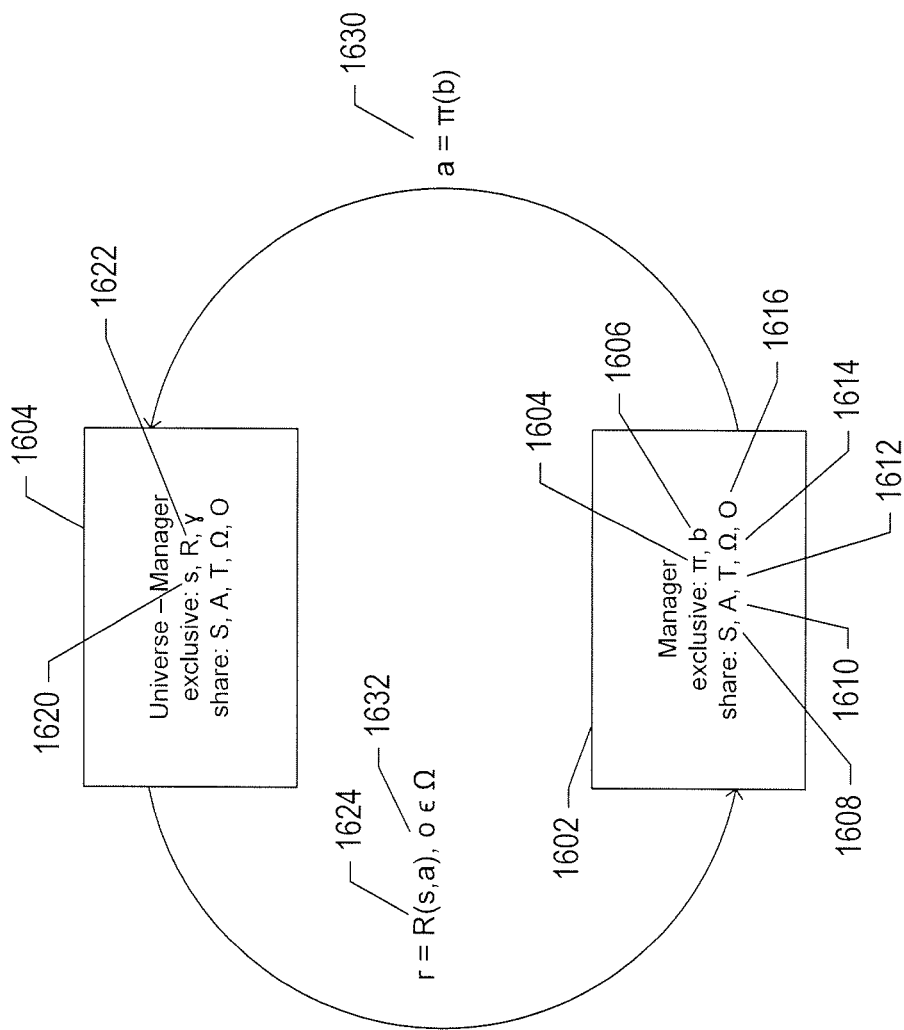
FIGS. 16A-B illustrate a simple flow diagram for the universe comprising the manager and the environment in one approach to reinforcement learning.
Figure 16B:
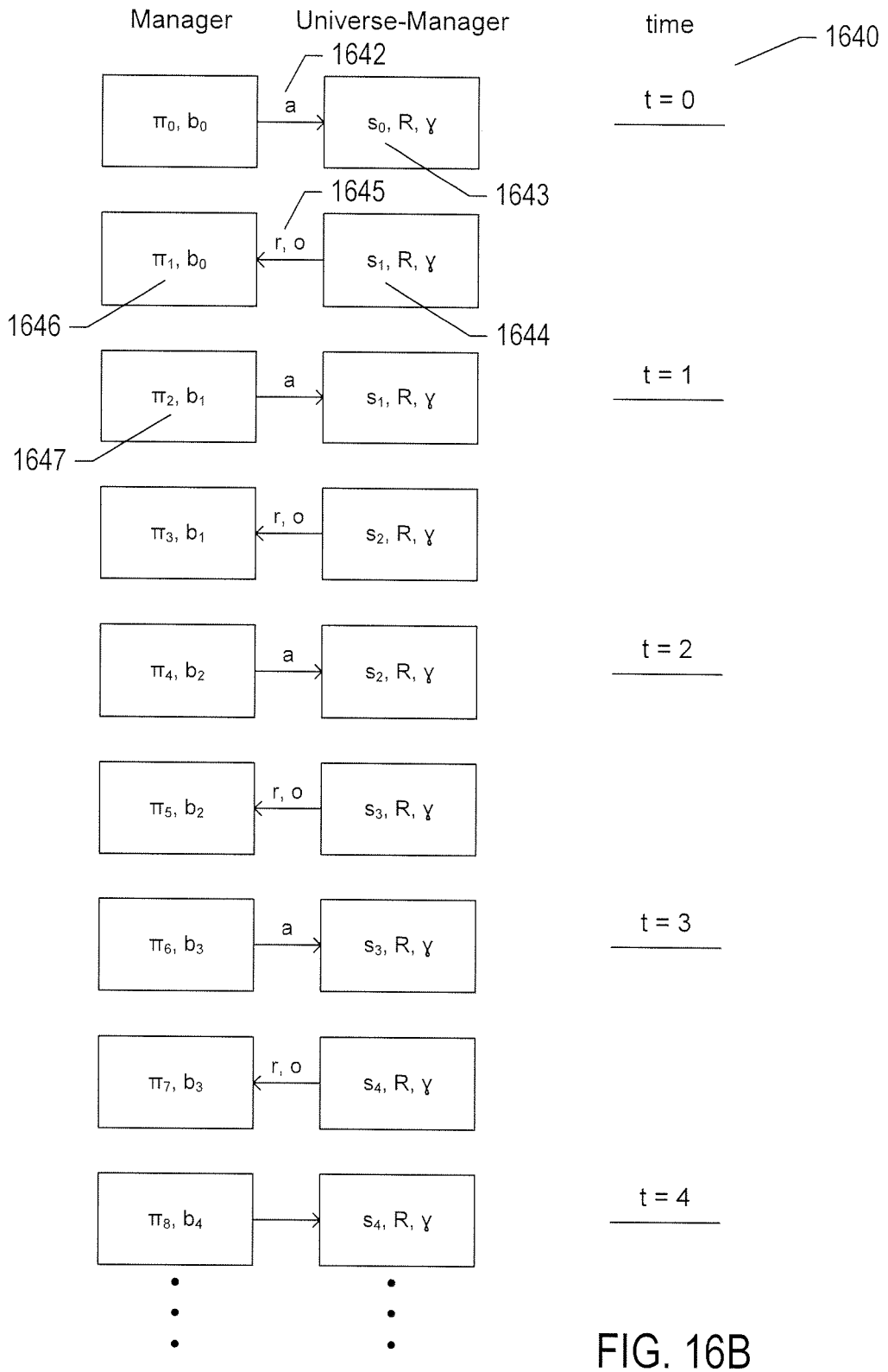

FIGS. 16A-B illustrate a simple flow diagram for the universe comprising the manager and the environment in one approach to reinforcement learning. The manager 1602 internally maintains a policy π 1604 and a belief distribution b 1606 and is aware of the set of environment states S 1608, the set of possible actions A 1610, the state-transition function T 1612, the set of possible observations Ω 1614 and, and the observation-probability function O 1616, all discussed above. The environment 1604 shares knowledge of the sets A, and Ω with the manager. Usually, the true state space S and the functions T and O are unknown and estimated by the manager. The environment maintains the current state of the environment s 1620, a reward function R 1622 that returns a reward r in response to an input current state s and an input action a received while in the current state 1624, and a discount parameter γ 1626, discussed below. The manager is initialized with an initial policy and belief distribution. The manager emits a next action 1630 based on the current belief distribution which the environment then carries out, resulting in the environment occupying a resultant state and then issues a reward 1624 and an observation o 1632 based on the resultant state and the received action. The manager receives the reward and observation, generally updates the internally stored policy and belief distribution, and then issues a next action, in response to which the environment transitions to a resultant state and emits a next reward and observation. This cycle continues indefinitely or until a termination condition arises.

It should be noted that this is just one model of a variety of different specific models that may be used for a reinforcement-learning agent and environment. There are many different models depending on various assumptions and desired control characteristics.

FIG. 16B shows an alternative way to illustrate operation of the universe. In this alternative illustration method, a sequence of time steps is shown, with the times indicated in a right-hand column 1640. Each time step consists of issuing, by the manager, an action to the environment and issuing, by the environment, a reward and observation to the manager. For example, in the first time step t=0, the manager issues an action a 1642, the environment transitions from state $s_0$ 1643 to $s_1$ 1644, and the environment issues a reward r and observation o 1645 to the manager. As a result, the manager updates the policy and belief distribution in preparation for the next time step. For example, the initial policy and belief distribution $\pi_0$ and $b_0$ 1646 are updated to the policy and belief distribution $\pi_1$ and $b_1$ 1647 at the beginning of the next time step t=1. The sequence of states $\{s_0, s_1, \ldots\}$ represents the trajectory of the environment as controlled by the manager. Each time step is thus equivalent to one full cycle of the control-flow-diagram-like representation discussed above with reference to FIG. 16A.

FIG. 17 provides additional details about the operation of the manager, environment, and universe. At the bottom of FIG. 17, a trajectory for the manager and environment is laid out horizontally with respect to the horizontal axis 1702 representing the time steps discussed above with reference to FIG. 16B. A first horizontal row 1704 includes the environment states, a second horizontal row 1706 includes the belief distributions, and a third horizontal row 1708 includes the issued rewards. At any particular state, such as circled state $s_4$ 1710, one can consider all of the subsequent rewards, shown for state $s_4$ within box 1712 in FIG. 17. The discounted return for state $s_4$, $G_4$, is the sum of a series of discounted rewards 1714. The first term in the series 1716 is the reward $r_5$ returned when the environment transitions from state $s_4$ to state $s_5$. Each subsequent term in the series includes the next reward multiplied by the discount rate γ raised to a power. The discounted reward can be alternatively expressed using a summation, as indicated in expression 1718. The value of a given state s, assuming a current policy π, is the expected discounted return for the state, and is returned by a value function $V^\pi(\ )$, as indicated by expression 1720. Alternatively, an action-value function returns a discounted return for a particular state and action, assuming a current policy, as indicated by expression 1722. An optimal policy π* provides a value for each state that is greater than or equal to the value provided by any possible policy it in the set of possible policies Π. There are many different ways for achieving an optimal policy. In general, these involve running a manager to control an environment while updating the value function $V^\pi(\ )$ and policy π, either in alternating sessions or concurrently. In some approaches to reinforcement learning, when the environment is more or less static, once an optimal policy is obtained during one or more training runs, the manager subsequently controls the environment according to the optimal policy. In other approaches, initial training generates an initial policy that is then continuously updated, along with the value function, in order to track changes in the environment so that a near-optimal policy is maintained by the manager.

Figure 18:
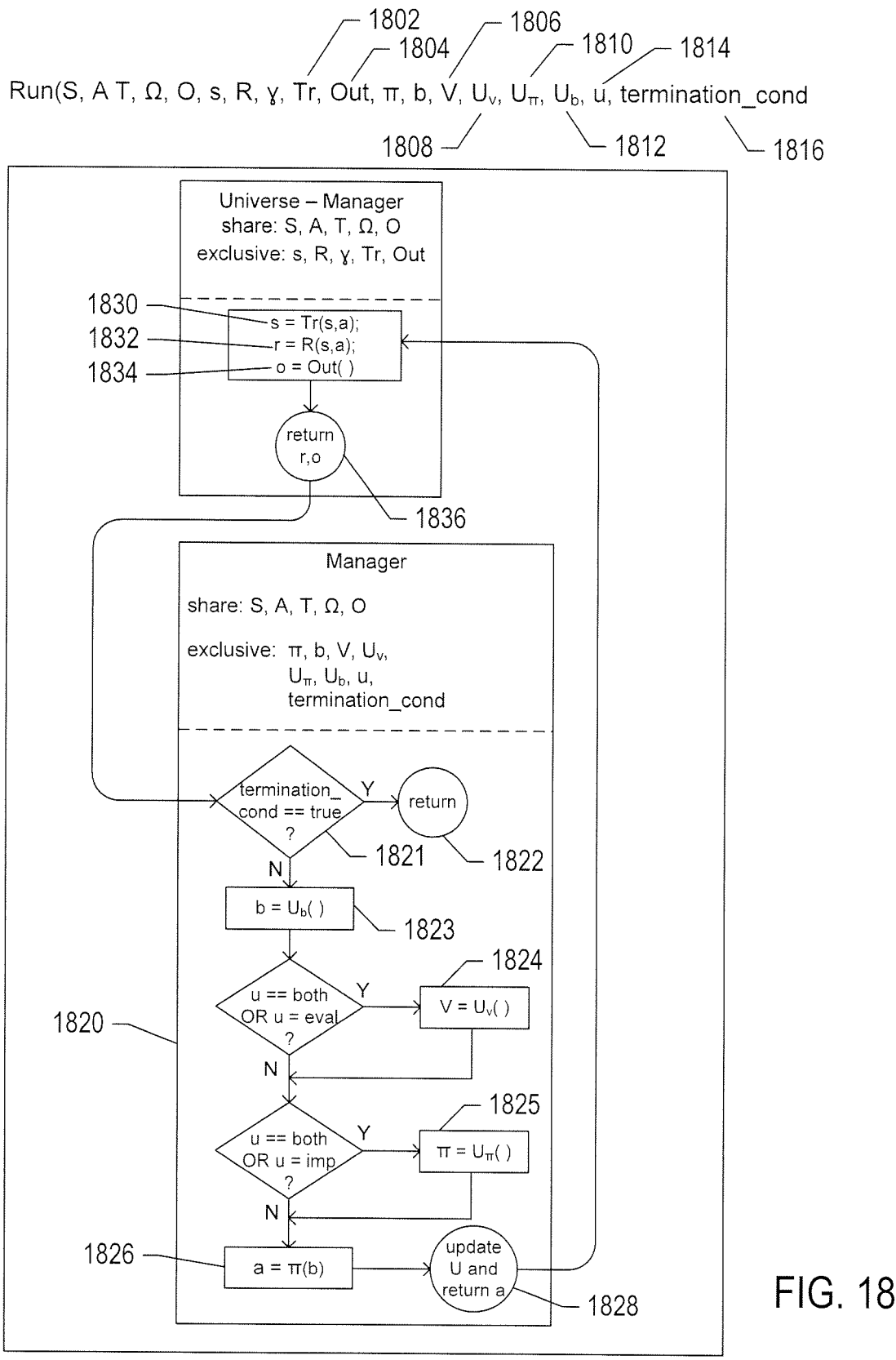
FIG. 18 provides a somewhat more detailed control-flow-like description of operation of the manager and environment than originally provided in FIG. 16A.

FIG. 18 provides a somewhat more detailed control-flow-like description of operation of the manager and environment than originally provided in FIG. 16A. The control-flow-like presentation corresponds to a run of the manager and environment that continues until a termination condition evaluates to TRUE. In addition to the previously discussed sets and functions, this model includes a state-transition function Tr 1802, an observation-generation function Out 1804, a value function V 1806, update functions $U_V$ 1808, $U_\pi$ 1810, and $U_b$ 1812 that update the value function, policy, and belief distribution, respectively, an update variable u 1814 that indicates whether to update the value function, policy, or both, and a termination condition 1816. The manager 1820 determines whether the termination condition evaluates to TRUE, in step 1821, and, if so, terminates in step 1822. Otherwise, the manager updates the belief, in step 1823 and updates one or both of the value function and policy, in steps 1824 and 1825, depending on the current value of the update variable u. In step 1826, the manager generates a new action and, in step 1828, updates the update variable u and issues the generated action to the environment. The environment determines a new state 1830, determines a reward 1832, and determines an observation 1834 and returns the generated reward and observation in step 1836.

Figure 19:
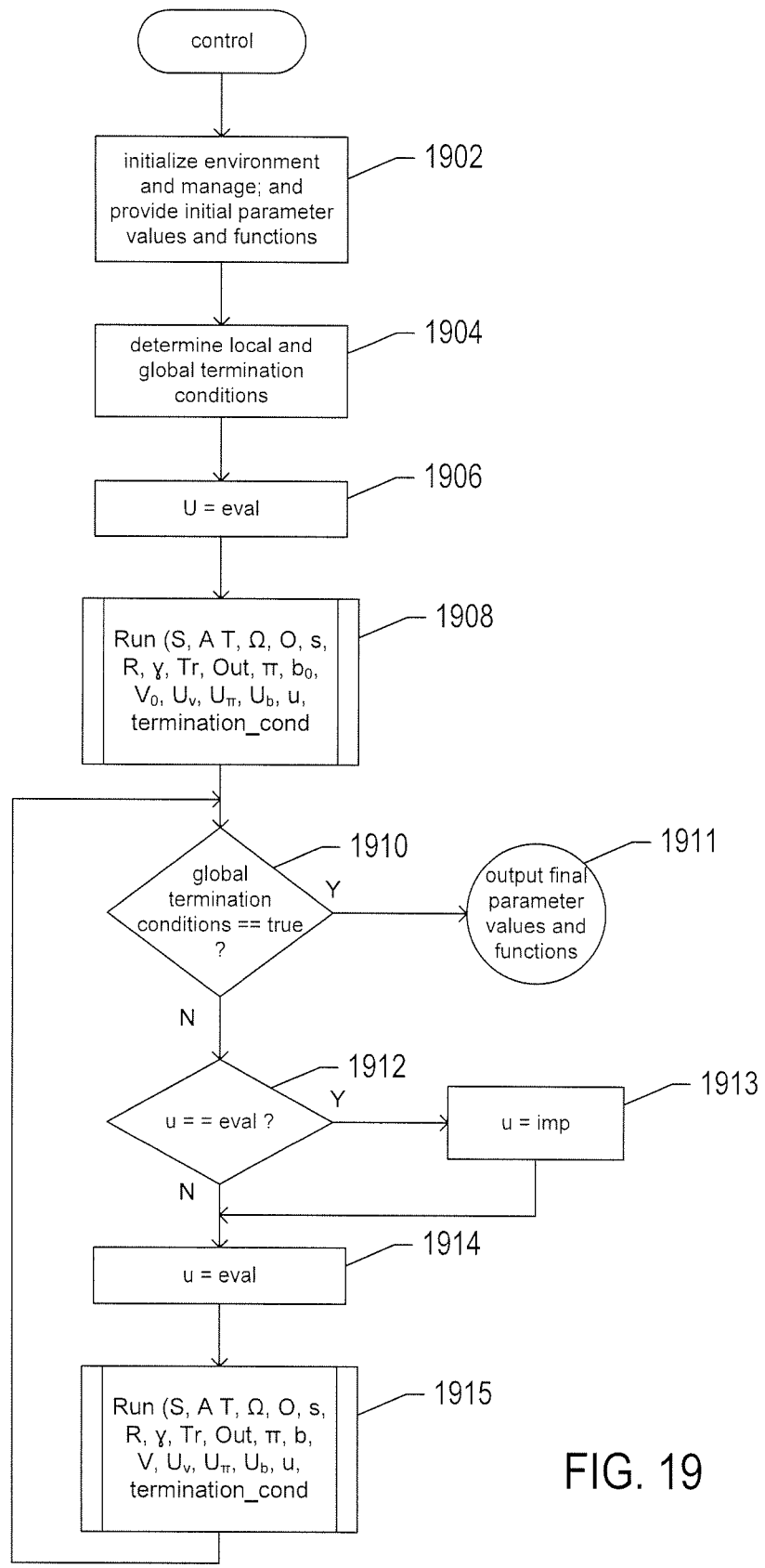
FIG. 19 provides a traditional control-flow diagram for operation of the manager and environment over multiple runs.

FIG. 19 provides a traditional control-flow diagram for operation of the manager and environment over multiple runs. In step 1902, the environment and manager are initialized. This involves initializing certain of the various sets, functions, parameters, and variables shown at the top of FIG. 18. In step 1904, local and global termination conditions are determined. When the local termination condition evaluates to TRUE, the run terminates. When the global termination condition evaluates to TRUE, operation of the manager terminates. In step 1906, the update variable u is initialized to indicate that the value function should be updated during the initial run. Step 1908 consists of the initial run, during which the value function is updated with respect to the initial policy. Then, additional runs are carried out in the loop of steps 1910-1915. When the global termination condition evaluates to TRUE, as determined in step 1910, operation of the manager is terminated in step 1911, with output of the final parameter values and functions. Thus, the manager may be operated for training purposes, according to the control-flow diagram shown in FIG. 19, with the final output parameter values and functions stored so that the manager can be subsequently operated, according to the control-flow diagram shown in FIG. 19, to control a live system. Otherwise, when the global termination condition does not evaluate to TRUE and when the update variable u has a value indicating that the value function should be updated, as determined in step 1912, the value stored in the update variable u is changed to indicate that the policy should be updated, in step 1913. Otherwise, the value stored in the update variable u is changed to indicate that the value function should be updated, in step 1914. Then, a next run, described by the control-flow-like diagram shown in FIG. 18, is carried out in step 1915. Following termination of this run, control flows back to step 1910 for a next iteration of the loop of steps 1910-1915. In alternative implementations, the update variable u may be initially set to indicate that both the value function and policy should be updated during each run and the update variable u is not subsequently changed. This approach involves different value-function and policy update functions than those used when only one of the value function and policy is updated during each run.

Figure 20:
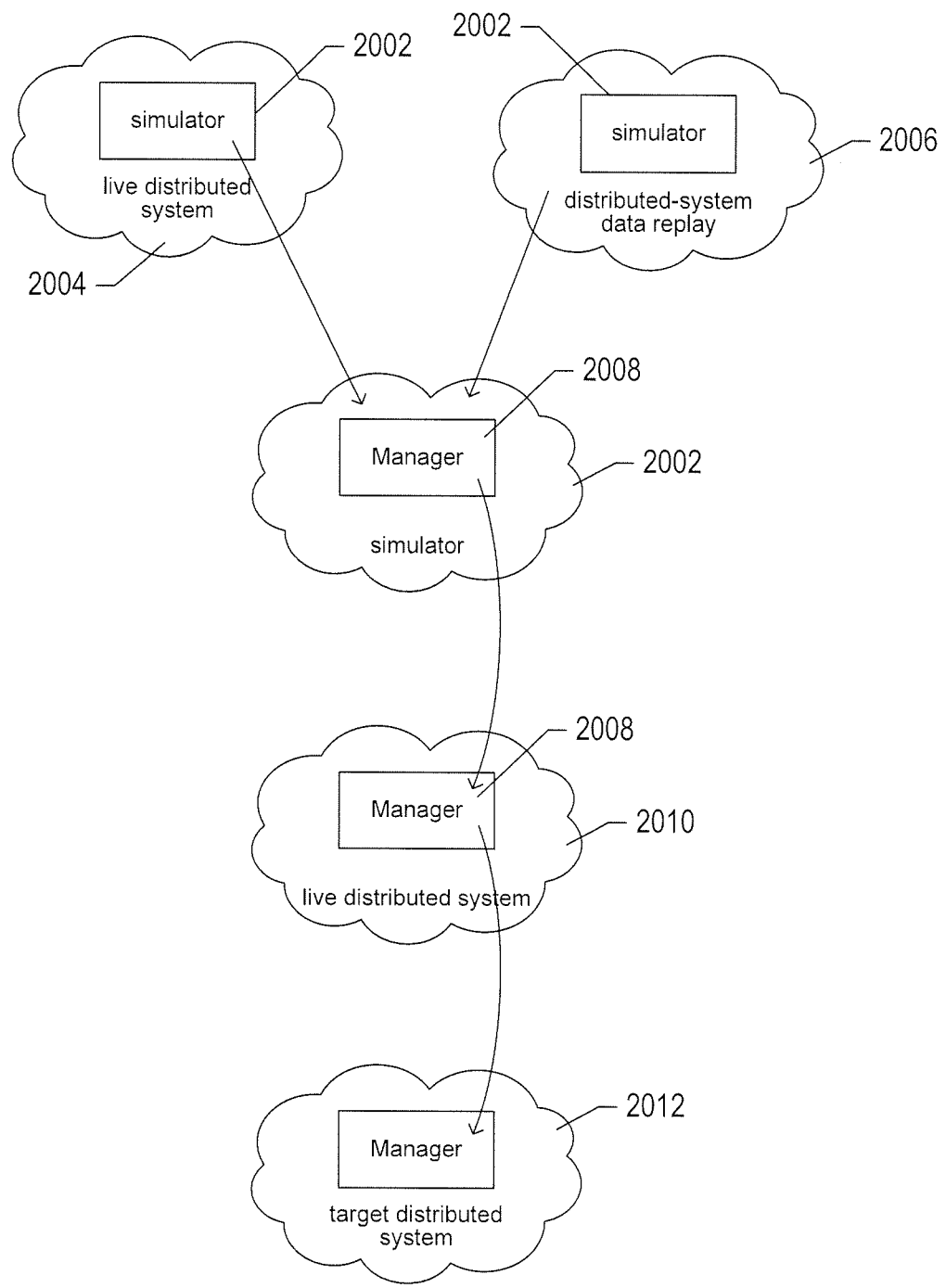
FIG. 20 illustrates one approach to using reinforcement learning to generate and operate an application manager.

FIG. 20 illustrates one approach to using reinforcement learning to generate and operate an application manager. First, reinforcement learning is used to train an environment simulator 2002 by one or both of operating the simulator against a live-distributed-system environment 2004 or against a simulated distributed-system environment that replays archived data generated by a live distributed system to the simulator 2006. Then, a manager 2008 is initially trained by controlling an environment consisting of the simulator 2002. The manager, once trained, is then operated for a time to control an environment comprising a live distributed system 2010. Once the manager has been trained both against the simulator and the live distributed system, it is ready to be deployed to manage an environment 2012 comprising a target live distributed system.

Figure 21:
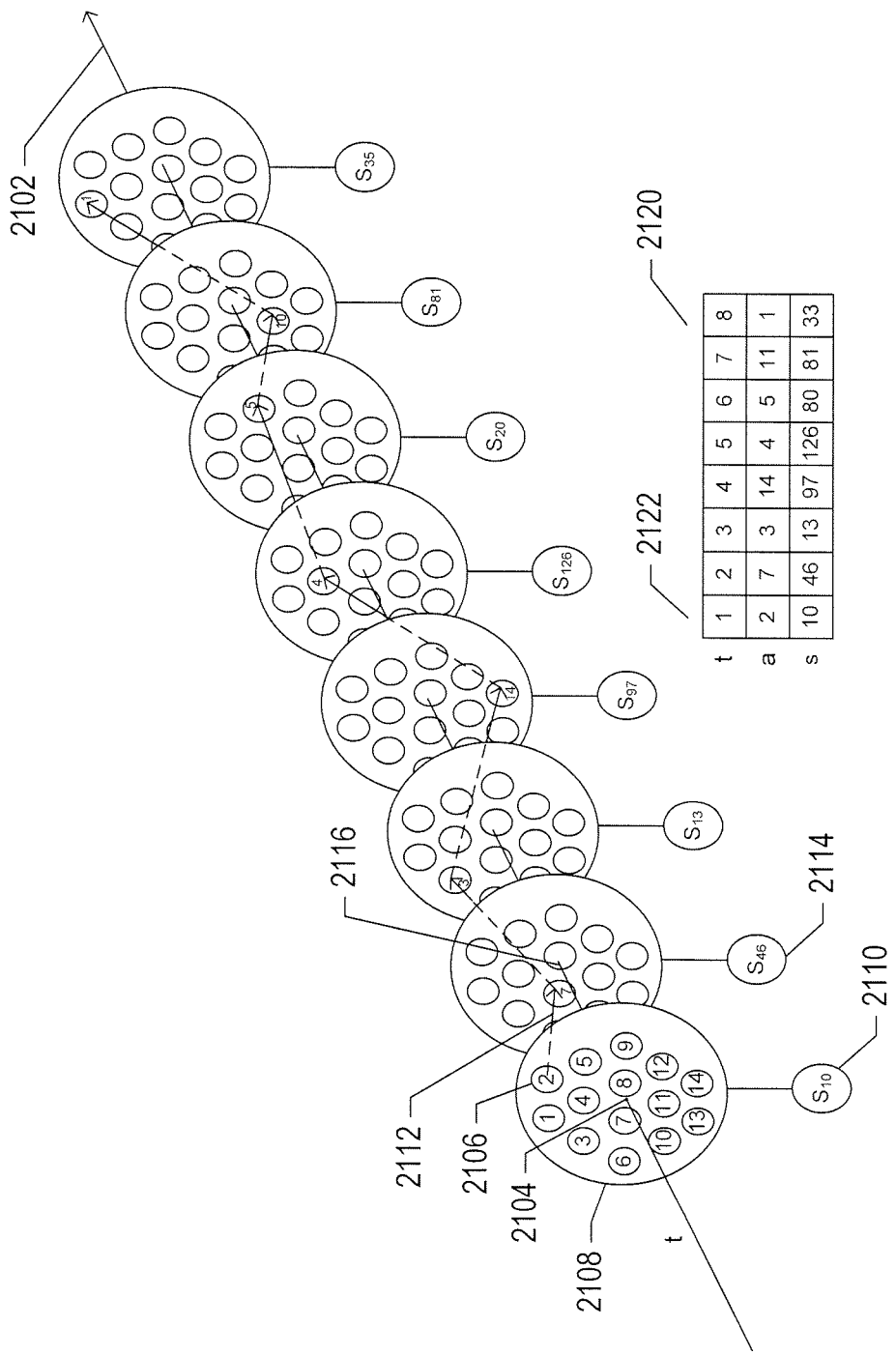
FIG. 21 illustrates an alternative view of a control trajectory comprising a sequence of executed of actions, each accompanied by a managed-environment state change.

Currently Disclosed Safe-Operation-Constrained Reinforcement-Learning-Based Application Manager FIG. 21 illustrates an alternative view of a control trajectory comprising a sequence of executed of actions, each accompanied by a managed-environment state change. In FIG. 21, arrow 2102 represents a timeline. At the beginning of each of multiple time intervals, a reinforcement-learning-based controller, such as the currently disclosed safe-operation-constrained reinforcement-learning-based application manager subsequently referred to below as the "application manager," invokes the above-discussed policy $\pi$ to select a next action from a set of actions A. For example, at the time interval that begins with time 2104, the reinforcement-learning-based controller invokes the policy $\pi$ to select action 2106, represented as a circle inscribing a numerical label "2," from the set of possible actions A, represented by disk 2108, which contains 14 different possible actions represented by smaller circles that each inscribe a different numeric label. Of course, in real-world situations, there may be hundreds, thousands, tens of thousands, or more different possible actions. The state of the managed-environment, at time 2104, is represented by the circle 2110 inscribing the label "$s_{10}$" indicating the managed-environment state. When the reinforcement-learning-based controller executes the selected action, as represented by arrow 2112, the managed environment transitions to a new state 2114 at a next point in time 2116, where the process is repeated to produce a next action and next state transition. Thus, reinforcement-learning-based control can be thought of as a trajectory through a state/action space. In the simple example of FIG. 21, with both actions and states represented by integers, the state/action space can be imagined as a two-dimensional plane with two orthogonal coordinate axes corresponding to actions and states. A control trajectory can be represented as a table, such as table 2120 shown in FIG. 21, containing three-value columns, such as column 2122, that each includes a time value, an indication of an action, and an indication of the state.

Figure 22:
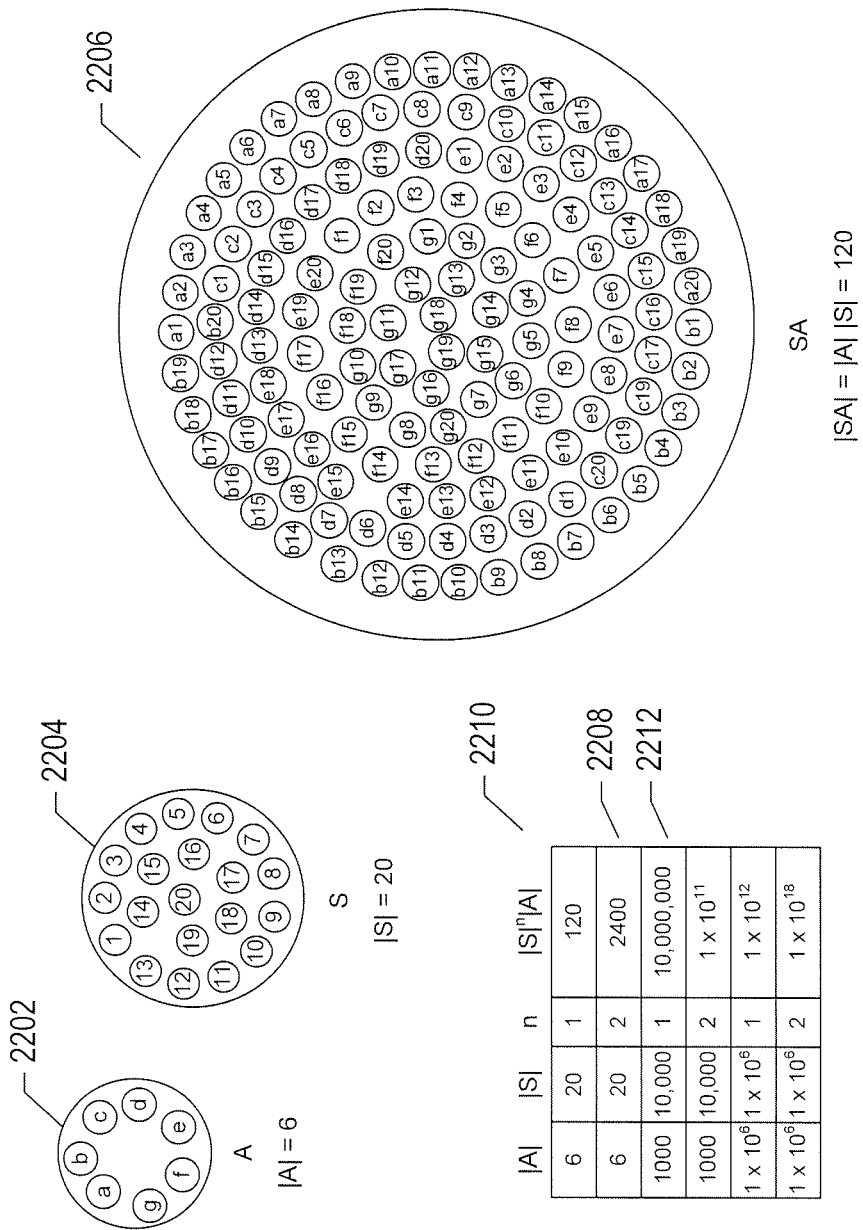
FIG. 22 illustrates the potential sizes of the set of possible state/action pairs.

FIG. 22 illustrates the potential sizes of the set of possible state/action pairs. Using similar illustration conventions as used in FIG. 21, FIG. 22 shows an illustration of a set of actions A 2202, with a cardinality of 6, and a set of states S 2204, with a cardinality of 20. In certain reinforcement-learning-based controller implementations, the policy $\pi$ is based on an assumed Markov model. In a Markov-model based policy, the policy $\pi$ selects a next action based on the current managed-environment state or, when the state is unknown to the reinforcement-learning-based controller, on the belief distribution b for the current managed-environment state, as discussed above. The set of possible state/action pairs SA 2206 can be thought of as the set of all possible current-state/next-action control decisions that can be generated from the set of possible actions A and the set of possible states S. For a Markov-based reinforcement-learning-based controller, the number of possible state/action pairs is equal to the product of the cardinalities of the set of possible actions A and the set of possible states S. In the example shown in FIG. 22, the number of possible state/action pairs is 120, even though there are only 6 possible actions and 20 possible states. Other types of reinforcement-learning-based controllers may consider the current state and the preceding state in order to choose a next action. In this case, each possible action-selection decision can be considered to be a triple comprising an action and two states. In this case, the number of possible control decisions is equal to the product of the cardinality of the set of possible actions A and the square of the cardinality of the set of possible states S. In yet other types of reinforcement-learning-based controllers, the n most recent states, including the current state, of the managed environment are considered when making an action-selection decision. The most general expression for the number of possible control decisions is: $|S|^n|A|$. In the case that n equals 2, there are 2400 possible control decisions for the example shown in FIG. 22, as indicated in the second row 2208 of the table 2210 shown in FIG. 22. Of course, in real-world problem domains, there may be very large numbers of different possible actions and states. As shown in the third row 2212 of the table 2210, when there are 1000 possible actions and 10,000 possible states, a controller using a Markov policy, where n is equal to 1, includes 10,000,000 different possible control decisions. It would take on the order of many months of testing time for a controller, given these figures, to sample each possible control decision. For a controller using a policy based on a model for which n is equal to 2, with 1000 possible actions and 10,000 possible states, there are $10^{11}$ different possible control decisions, which would take many thousands of years for controller to sample once each. Thus, in practical, real-world situations, the number of possible control decisions, which represents the state space that a reinforcement-learning-based control system needs to explore in order to find an optimal policy, can be enormous.

Figure 23A:
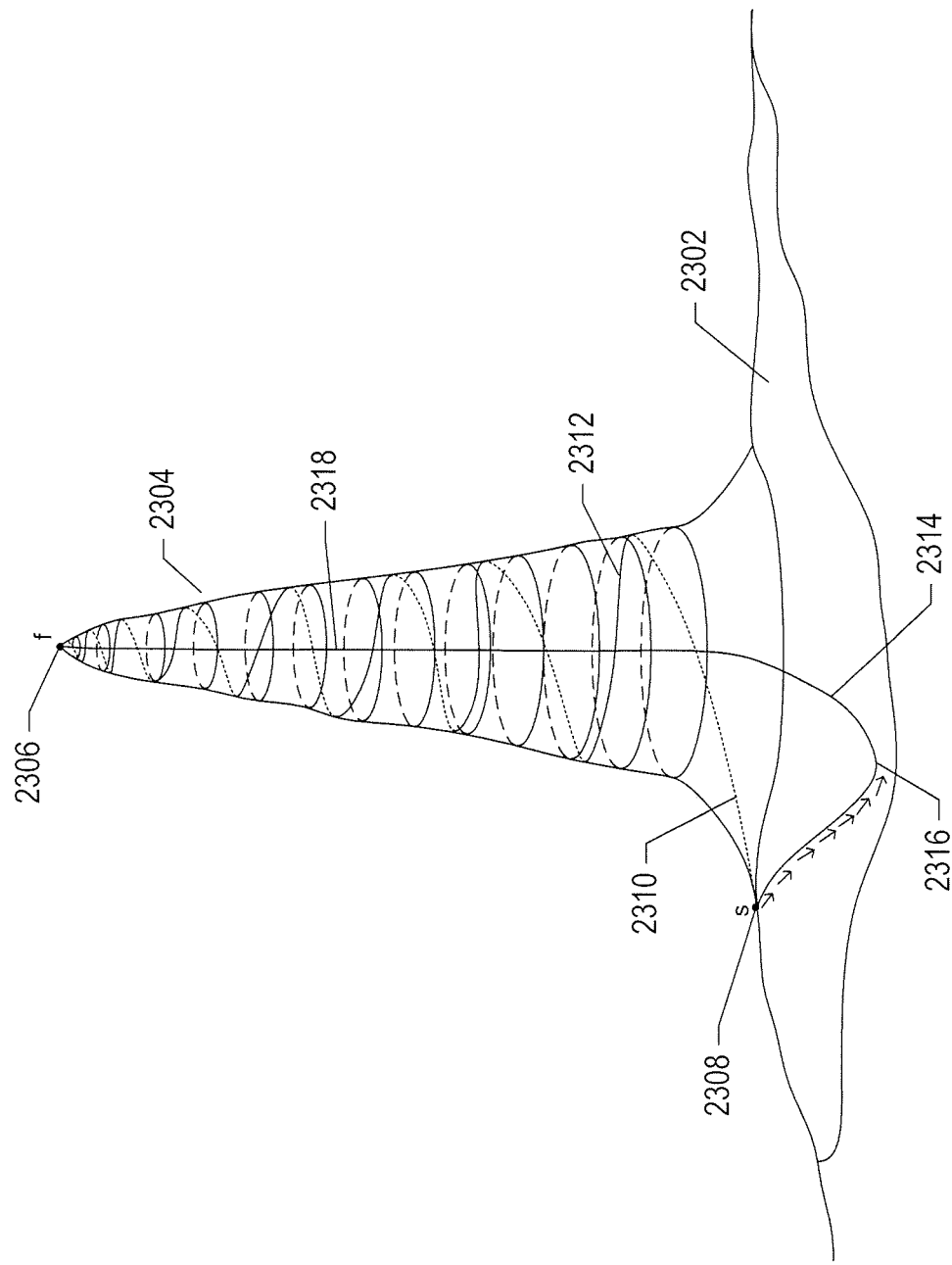
FIGS. 23A-B illustrate the need for state/action exploration by a reinforcement-learning-based controller.
Figure 23B:
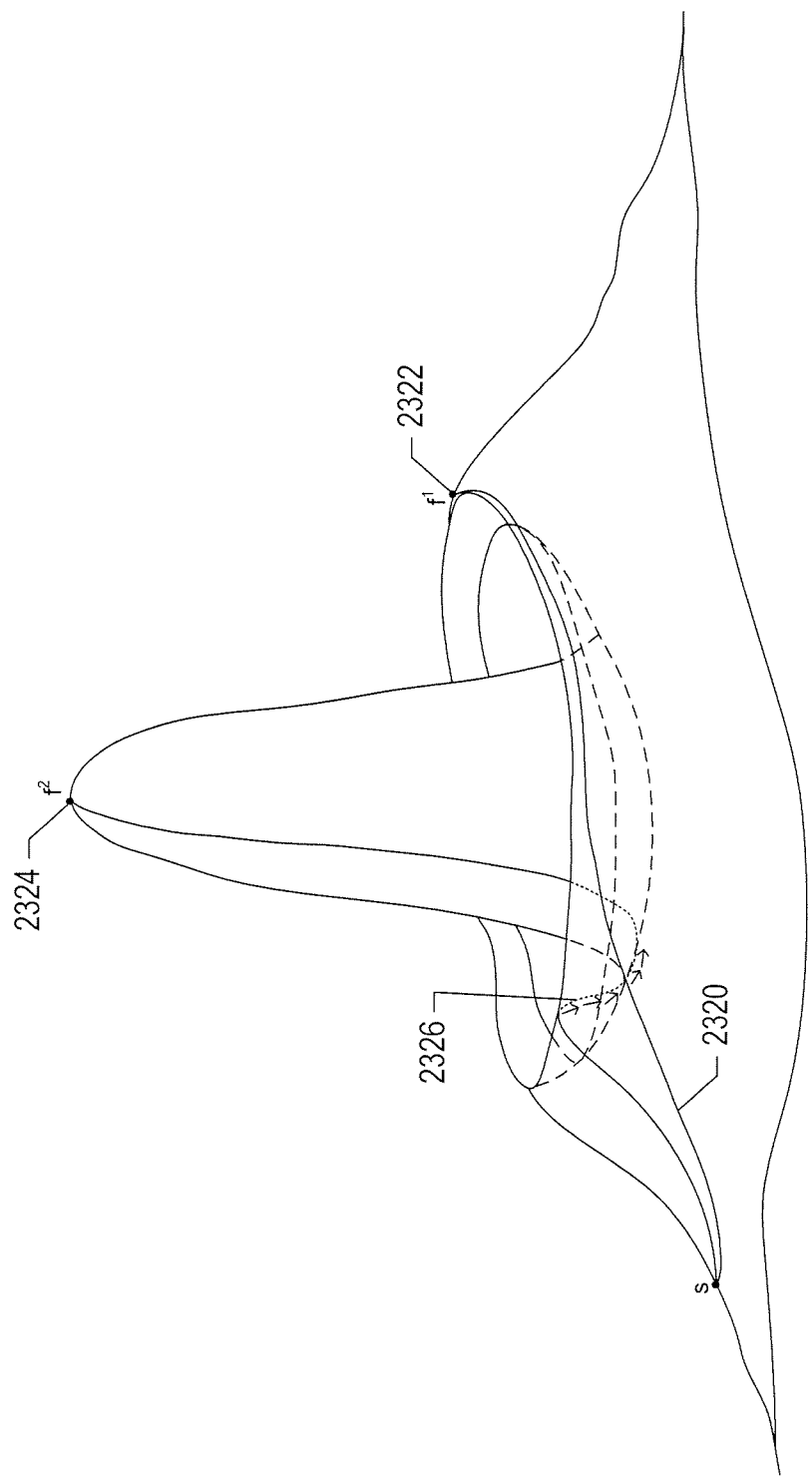

FIGS. 23A-B illustrate the need for state/action exploration by a reinforcement-learning-based controller. FIGS. 23A-B both use the same illustration conventions, next described with reference to FIG. 23A. A portion of a surface 2302 that represents the value or expected reward for state/action pairs includes a rather prominent peak 2304. The point at the summit of the surface 2306 represents a state/action pair that generates the greatest expected reward or value. In static environments, a reinforcement-learning-based controller, over time, seeks to obtain the maximum possible value by reaching point 2306, starting from an initial point 2308. Two different trajectories are shown in FIG. 23A. In non-static environments, the controller seeks to obtain a maximum discounted reward over the most recent window in time. A first trajectory 2310 gradually ascends the peak, initially ascending the back side of the peak, wrapping around to the front side of the peak 2312, and slowly spiraling upward, continuously reaching higher-valued state/action pairs until reaching point 2306. A second trajectory 2314 initially descends to a lower point on the surface 2316 and then directly and steeply ascends 2318 to point 2306. In this case, if the number of actions needed to be taken in order to reach the optimal control decision is a measure of the efficiency of the reinforcement-learning-based controller, the second trajectory 2314 is by far most efficient. However, the second trajectory involves initially carrying out locally suboptimal actions of decreasing value. Of course, this is a somewhat artificial example and illustration, since trajectories would not generally map to quasi-continuous curves and would normally not continuously increase in value, but is intended to show that, unless the reinforcement-learning-based controller carries out a certain amount of state/action space exploration, the reinforcement-learning-based controller cannot discover optimal policies $\pi^*$. In other words, were the reinforcement-learning-based controller to always select the currently most valuable action, and thus follow a greedy policy, the reinforcement-learning-based controller would generally fail to find the most efficient trajectories. As shown in FIG. 23B, in a different example, a greedy policy may allow a reinforcement-learning-based controller to find a trajectory 2320 that results in discovery of a locally optimal state/action pair 2322, but would not allow the reinforcement-learning-based controller to find the global optimal 2324, since all trajectories leading to the global optimum involve a stretch of non-optimal action selections 2326.

Figure 24:
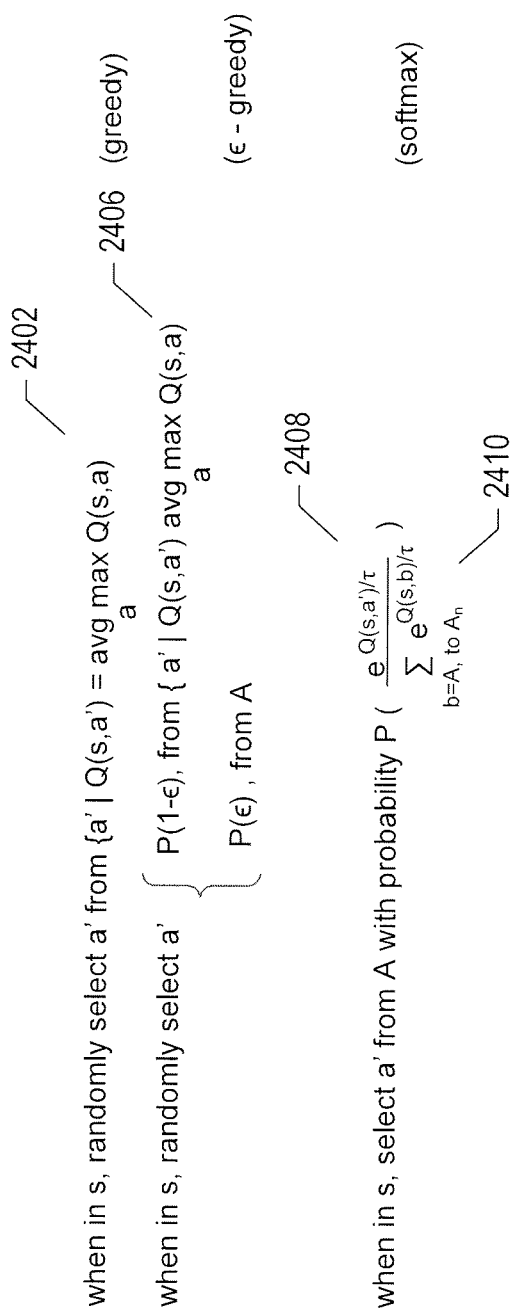
FIG. 24 provides expressions illustrating various types of policies.

FIG. 24 provides expressions illustrating various types of policies. As discussed above, an action-value function $Q^\pi(s, a)$ (1722 in FIG. 17) returns a discounted return for a particular state and action, assuming a current policy $\pi$. A first expression 2402 represents the greedy policy. When the reinforcement-learning-based controller is in a state s, the greedy policy selects a next action a' for which the discounted expected return value is maximum among all possible actions a. As discussed above, the greedy policy generally does not allow a reinforcement-learning-based controller to efficiently find optimally efficient trajectories and optimal state/action pairs, and may not allow a reinforcement-learning-based controller to efficiently find optimally efficient trajectories regardless of the control/learning period during which the reinforcement-learning-based controller operates. The $\epsilon$-greedy policy 2406 selects a next action a' according to the greedy policy with a probability of $1-\epsilon$ and selects a next action randomly from A with a probability of $\epsilon$. In general, c as a relatively low value, such as 0.1 or 0.01, so that, most of the time, the $\epsilon$-greedy policy selects a next action with the maximum discounted-return value. However, occasionally, the $\epsilon$-greedy policy randomly selects a next action, so that, over time, the reinforcement-learning-based controller tries a wide variety of the many possible control decisions. By exploring the state/action space, the reinforcement-learning-based controller gradually learns to assign accurate discounted expected-return values to the various different state/action pairs so that the policy can be optimized. The SoftMax policy 2408 randomly selects a next action a' from A with the probability 2410, which corresponds to the Boltzmann distribution used in statistical mechanics. When the temperature factor $\tau$ has a low value, approaching 0, the probabilities of selection vary dramatically with the estimated discounted return for the state/action, but when the temperature factor $\tau$ has a large value, the differences in the probabilities of selection diminish. Like the $\epsilon$-greedy policy, the SoftMax policy favors selection of an action with the greatest estimated return value, but occasionally selects non-optimal actions in order to facilitate state/action space exploration.

FIG. 25 illustrates one implementation of a reinforcement-learning-based application manager that employs state/action-space exploration via the above-discussed $\epsilon$-greedy policy. As indicated by expression 2502, the policy employed by this implementation, $\pi(b)$, selects a next action a' with maximum estimated value with a probability of $1-\epsilon$ and randomly selects the next action a' from A the probability of $\epsilon$, and is therefore an $\epsilon$-greedy policy. In this implementation, as indicated by expression 2504, there is no explicit policy-update function, unlike the case in the implementation illustrated in FIG. 18. Instead, a state/action-value update function $U_Q(\ )$ 2506 is employed. This function updates the state/action value Q(b,a) by adding to the state/action value Q(b,a) the product of a learning rate a 2508 and an estimate of the most recent return value 2510, where r is the reward received from executing action a, γ is the above-discussed discount rate, and b' and a' are the updated belief distribution and new selected action following execution of action a. Diagram 2512 illustrates the application manager logic that replaces the logic 1820 previously shown in FIG. 18. After execution of an action a, the universe returns the resulting reward r and observation vector o via path 2514. If the termination condition has occurred, as determined in step 2516, the application manager terminates, in step 2518. Otherwise, in step 2520, the application manager generates an updated belief distribution b' using the belief-distribution-update function that, in turn, considers the returned observation vector o returned by the managed environment, and, in step 2522, applies the policy (2502) to generate a next action a' using the updated belief distribution b'. Then, in step 2524, the application manager updates the discounted return value for the preceding action and belief distribution using the state/action-value update function 2506. In step 2526, the application manager stores the updated belief distribution as the current belief distribution and then returns the next action a' to the managed environment via path 2528.

As discussed above, for even modest numbers of possible actions and states, the state/action space can be enormous. In many real-world scenarios, there may be enormous numbers of possible actions and states, as a result of which the state/action space may be many tens of orders of magnitude larger than could possibly be practically exhaustively searched by exploration policies. Furthermore, there would be insufficient memory in even the largest distributed computing systems for maintaining current discounted values for each possible state/action pair. For these reasons, as indicated by expression 2530, the reinforcement-learning-based controller uses a parameterized function $Q_t(s,a)$ that returns, at any point in time t, an estimate of the value of the state/action pair s/a. The function $Q_t(s,a)$ is a function of n parameters contained in a parameter vector $\theta_t$. As indicated by expression 2532, the action-value update function $U_Q(\ )$ updates the parameter values via a gradient-descent method rather than updating a stored action value Q(b,a). Thus, at time t+1, the previous parameter vector $\theta_t$ is updated to parameter vector $\theta_{t+1}$.

Figure 26:
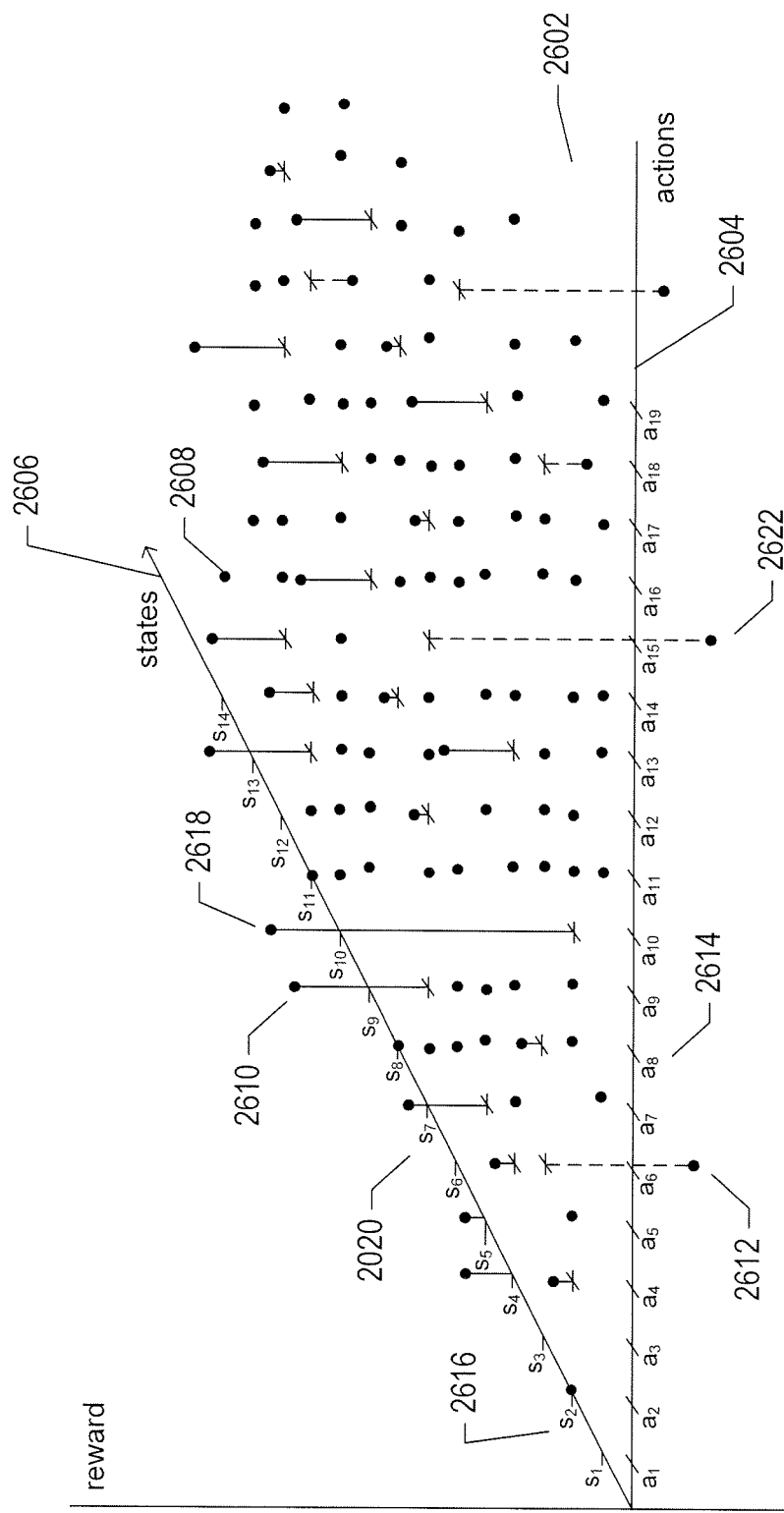
FIG. 26 illustrates rewards resulting from various actions issued to the managed environment by the application manager.

FIG. 26 illustrates rewards resulting from various actions issued to the managed environment by the application manager. Plane 2602, containing an action axis 2604 and a state axis 2606, represents a portion of the possible state/action pairs, and the rewards received by executing the action of a state/action pair when the managed system is in the state of the state/action pair are represented by small filled disks, such as filled disk 2608. No rewards are shown for many positions on the plane, indicating that the set of valid or reachable state/action pairs may not be the entire cross product of the set of possible actions A in the set of possible states S. In many cases, the reward returned from execution of an action has the value 0, as a result of which the filled disk representing the reward is coincident with plane 2602. However, certain state/action pairs are associated with the positive rewards, such as positive reward 2610, or negative rewards, such as negative reward 2612. Consider action $a_8$ 2614. When in state $s_2$ 2616, execution of action $a_8$ by the managed system generates a very large positive reward 2618. However, when in state $s_7$ 2620, execution of action $a_8$ by the managed system generates a very large negative reward 2622. This negative reward may indicate that execution of action $a_8$ by the managed system when in state $s_7$ has a very deleterious effect on the managed system, perhaps even causing data loss or a system crash. This, of course, is a very undesirable outcome, and it would be foolish to implement the application manager in such a way that it would inadvertently explore such deleterious state/action pairs. However, action $a_8$ clearly has a very positive result when executed in state $s_2$, and thus it would also be foolish to entirely remove action $a_8$ from the possible set of actions A. Action $a_8$ may, in fact, be critical to optimal control of the managed system. The currently disclosed safe-operation-constrained reinforcement-learning-based application manager is designed and implemented in order to allow state/action-space exploration so that the application manager can learn, over time, the action values and state values for the managed system and thus achieve an optimal or near-optimal management policy while, at the same time, constraining action selection to avoid issuance, by the application manager, of clearly deleterious actions for execution by the managed system.

Figure 27:
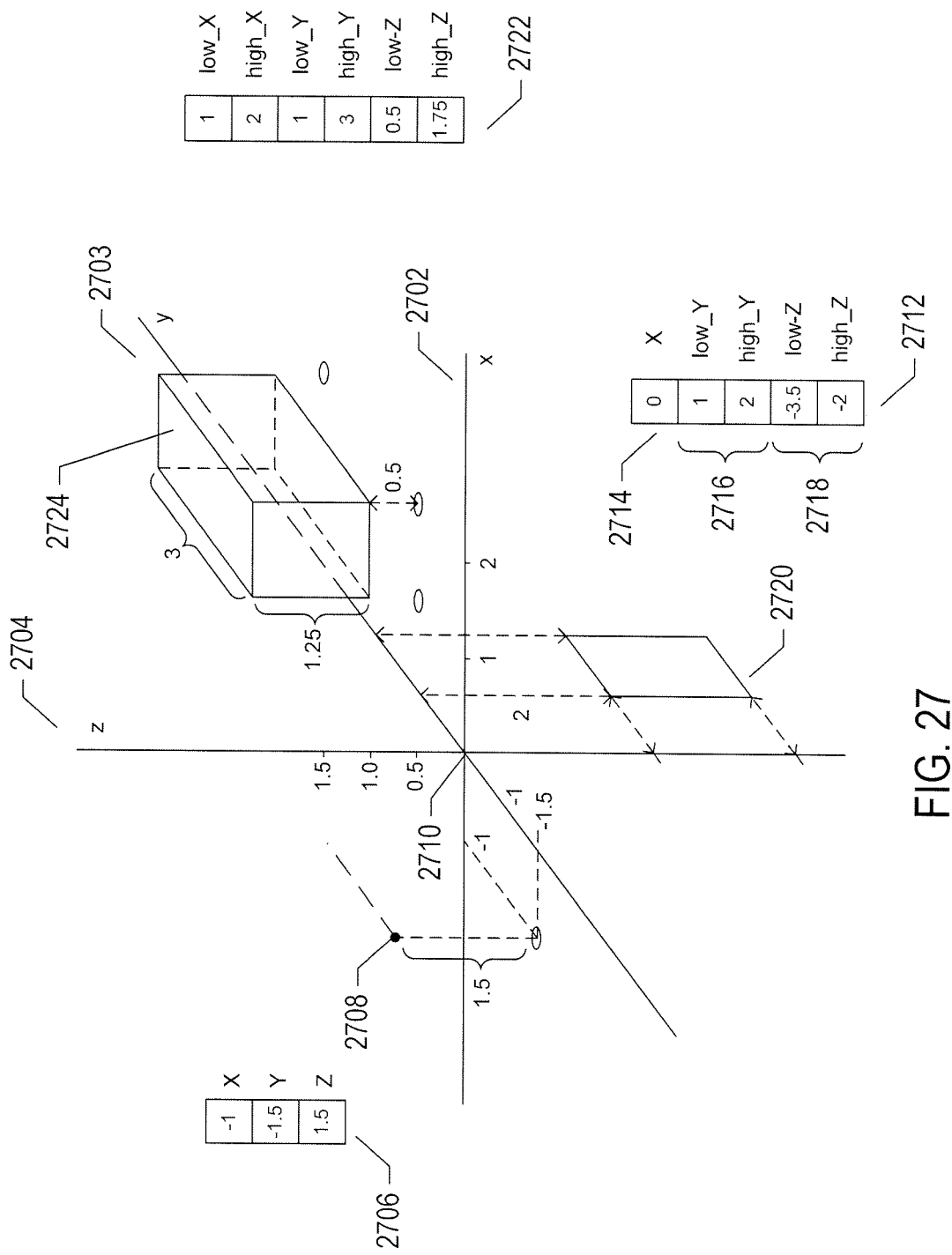
FIG. 27 illustrates vectors containing numerical elements that can be considered to represent points, areas, or volumes within a Euclidean space.

FIG. 27 illustrates vectors containing numerical elements that can be considered to represent points, areas, or volumes within a Euclidean space. The Euclidean space in FIG. 27 is a 3-dimensional Euclidean space, since it is impossible to intuitively represent higher-dimensioned spaces in figures. The 3-dimensional Euclidean space is defined by the three familiar orthogonal axes x, y, and z 2702-2704. The three-element vector 2706 can be interpreted as a containing the coordinates for the point 2708 in three-dimensional Euclidean space. Of course, this vector may be alternatively interpreted in many other ways. For example, the first element may be interpreted as the y coordinate rather than the x coordinate and the second element may be interpreted as the x coordinate rather than the y coordinate. As another example, the numeric values may be interpreted as the coordinate values divided by 10, so that the three-dimensional point is actually much further way from the origin 2710. The five-element vector 2712 may be interpreted as containing an x-coordinate value 2714, a range for the y-coordinate value 2716, with the range expressed as a low value and a high value, and a range for the z-coordinate value 2718. By this interpretation, vector 2712 may represent the area 2720. The six-element vector 2722 may be interpreted as containing ranges for all three coordinates, representing, by this interpretation, volume 2724. By adjusting some of these values, the volume can be expanded or contracted in each of the three different directions corresponding to the three coordinate axes. Similarly, by varying the values in the five-element vector 2712, according to the above-discuss interpretation of the numeric values in the vector, the area 2720 may be expanded or contracted in the y and z directions and may be shifted from left to right with respect to the x axis.

Figure 28:
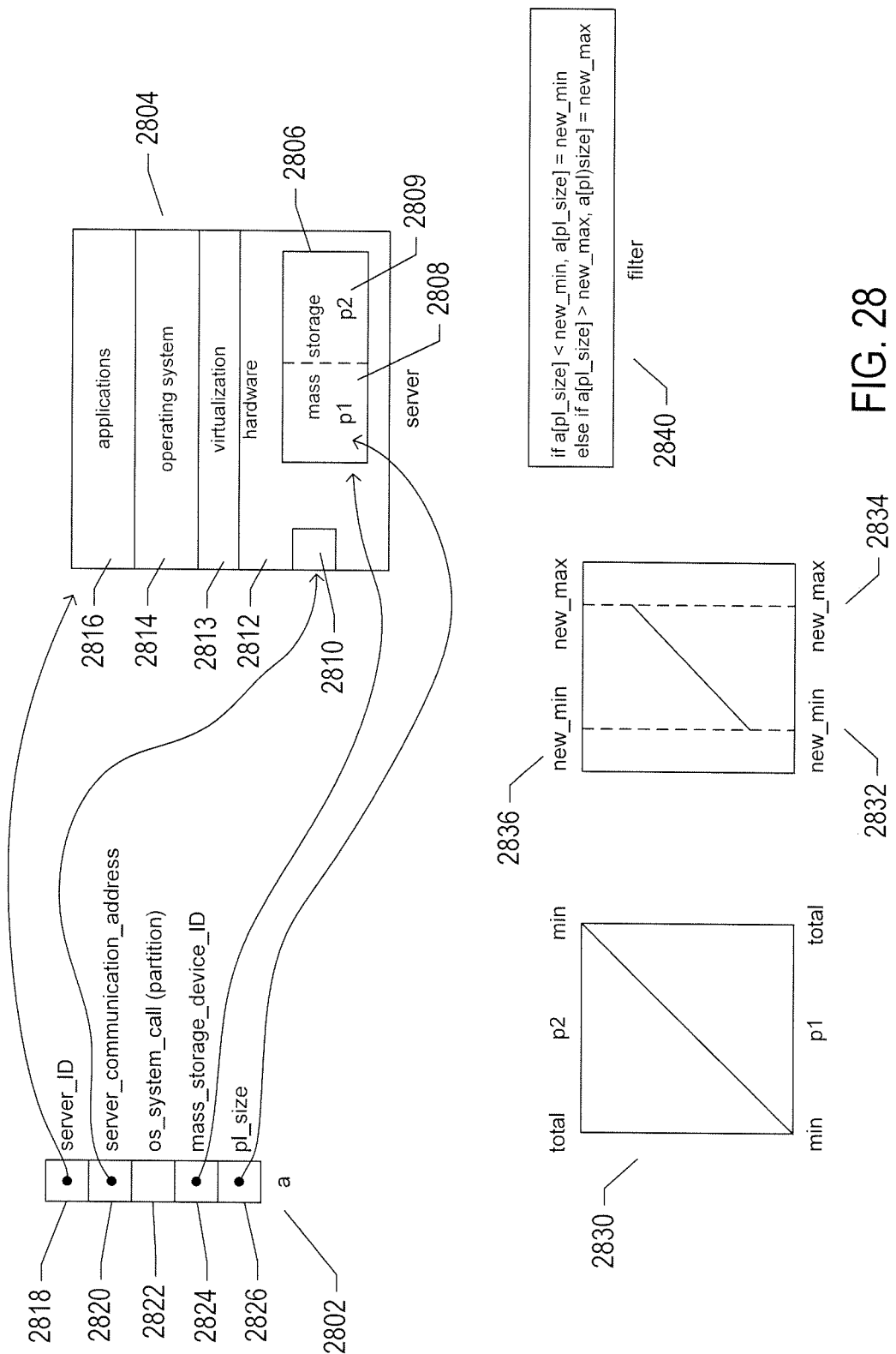
FIG. 28 illustrates applying a filter to an action vector in order to prevent issuance of an action, by an application manager, known to have deleterious consequences.

FIG. 28 illustrates applying a filter to an action vector in order to prevent issuance of an action, by an application manager, known to have deleterious consequences. The example action vector 2802 describes a system call to the operating system of a server in order to carry out a binary partitioning of a mass-storage device within the server. In FIG. 28A, a server is represented by a block diagram 2804 showing a mass-storage device 2806 partitioned into two partitions 2808-2809, a hardware communications port 2810, and hardware 2812, virtualization 2813, operating system 2814, and application 2816 layers. The action vector 2802 includes an indication of a server identifier 2818, a communications address for the server 2820, an indication of the partition operating-system call represented by the action 2822, an identifier for the mass-storage device 2024, and the size of one of the two partitions 2826. This action vector can be emitted by the application manager to the managed system in order to carry out partitioning of the mass-storage device within a particular server. The operating-system call can accept partition sizes from 0 to the total storage capacity of the mass-storage device. For example, the numerical value 2826 may range from 0 to 1. This means that each partition can range from empty to the total capacity of the mass-storage device, as indicated by diagram 2830. However, it may have been discovered that, because of certain bugs or anomalies in the managed system, unless each of the two partitions has a minimum size greater than 0, certain types of other actions issued by the application manager may result in server crashes and even more widespread and serious problems. Therefore, it would be highly imprudent to allow the application manager to employ an exploration-based policy that would explore a partition action with a final-element value 2826 less than the minimum size needed to avoid server crashes and other problems. In other words, action vector 2802 can be thought of as representing a large number of different possible actions occupying a hyper-volume in a five-dimensional space. However, because of the problem with less than minimum size partitions, it would be desirable to constrain the application manager to a smaller hyper-volume that does not contain actions having a numerical value in the final element 2826 less than the minimum partition size or greater than a corresponding maximum partition size. Thus, the desired partition value should fall between the minimum partition size 2832 and a maximum partition size 2834 that avoids either the two partitions having less than a minimum size, as shown in diagram 2836. The change in the area or volume corresponding to a set of action vectors can be thought of as applying a safe-operation constraint in order to avoid issuance, by the application manager, of clearly deleterious actions to the managed system. This can be accomplished by applying a filter 2840 to the action vector. Filter 2840 contains an if-else statement that sets the partition-size value to the minimum partition size, in the case of the partition-size value is less than the minimum partition size, and sets the partition-size value to a maximum partition size if the partition-size value is greater than the maximum partition size. By applying filter 284 to an action vector of the partition-a-mass-storage-device type, the application manager can ensure that the partition sizes are constrained, as indicated by 2836, and that no deleterious partition-a-mass-storage-device actions are issued to the managed system.

FIG. 29 illustrates a second type of application-vector filter. The filter discussed above, with reference to FIG. 28, constrains actions, based on known understandings of their potential deleterious effects, to safe areas, volumes, or hyper volumes in state/action space. A second type of filter considers both an action vector as well as a prediction of the observation vector, o', or a portion of that vector, that will be returned following execution of the action by the managed environment. An example filter 2902 is shown in FIG. 29. In a first if statement 2904, the filter considers the $m^{th}$ element of the predicted observation vector o'. When the $m^{th}$ element of the predicted observation vector o' has a value greater than a first threshold value, the value stored in the $n^{th}$ element of the action vector is decreased by half until the value stored in the $n^{th}$ element of the action vector falls below a maximum value. In a second if statement 2906, when the $w^{th}$ element of the predicted observation vector o' is greater than the $x^{th}$ element of the predicted observation vector o', and when the $y^{th}$ element of the predicted observation vector o' is greater than a second threshold value, the $p^{th}$ element of the action vector is set to 0. In a third if statement 2908, when either of the $w^{th}$ and $v^{th}$ elements of the predicted observation vector o' is 0, the action vector is set to NULL. These are, of course, but a few examples of the type of logic that may be included in the second type of filter. The second type of filter differs from the first type of filter in that action vectors are subject to constraints based on predicted results from executing them, rather than based on known safe boundaries. The predicted observation vector o' may, in certain implementations, be obtained by execution of various parameterized functions, rather than consulting tabular information.

Figure 30A:
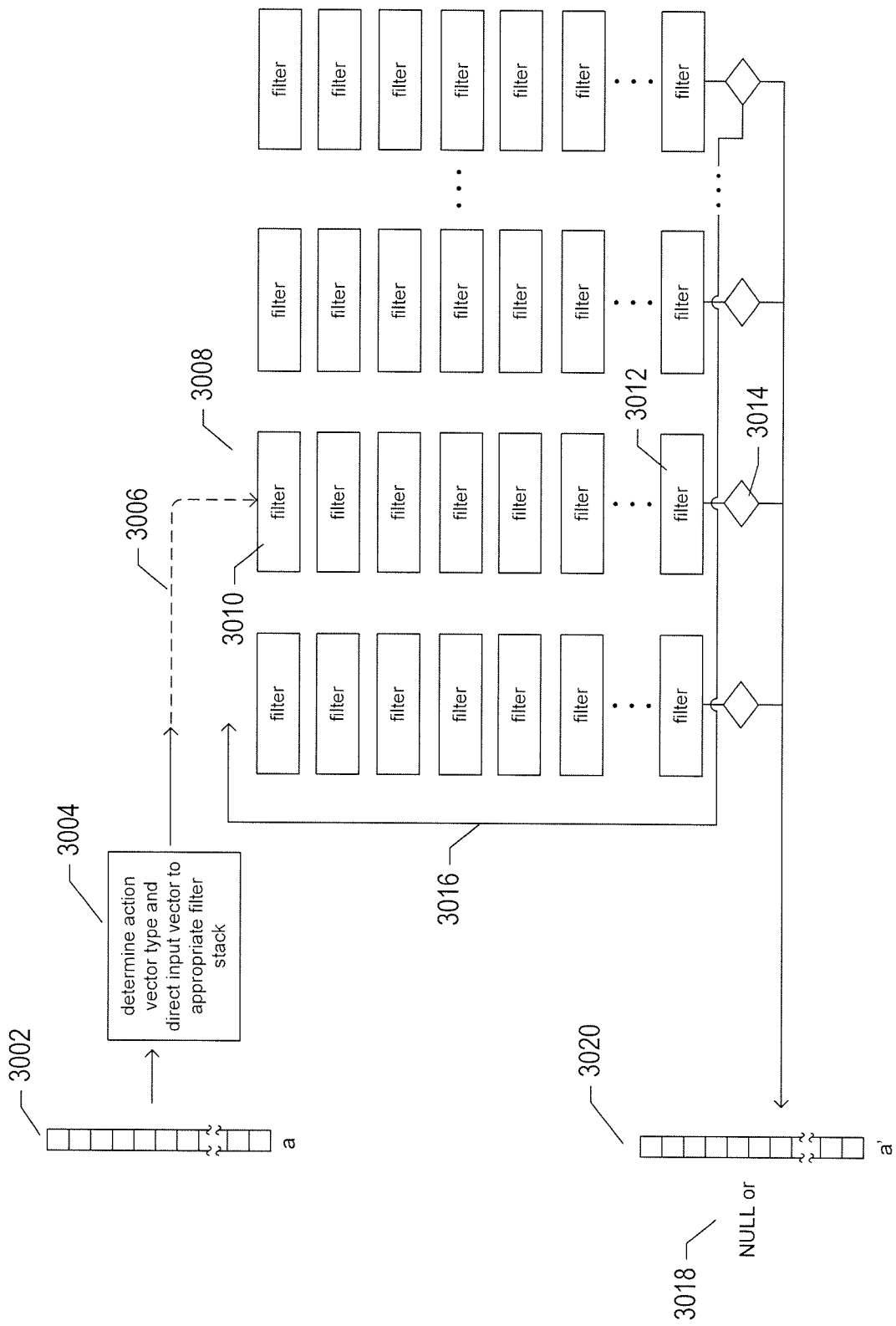
FIGS. 30A-B illustrate a first filtering subsystem that filters actions with respect to known constraints, as discussed above with reference to FIG. 28.
Figure 30B:
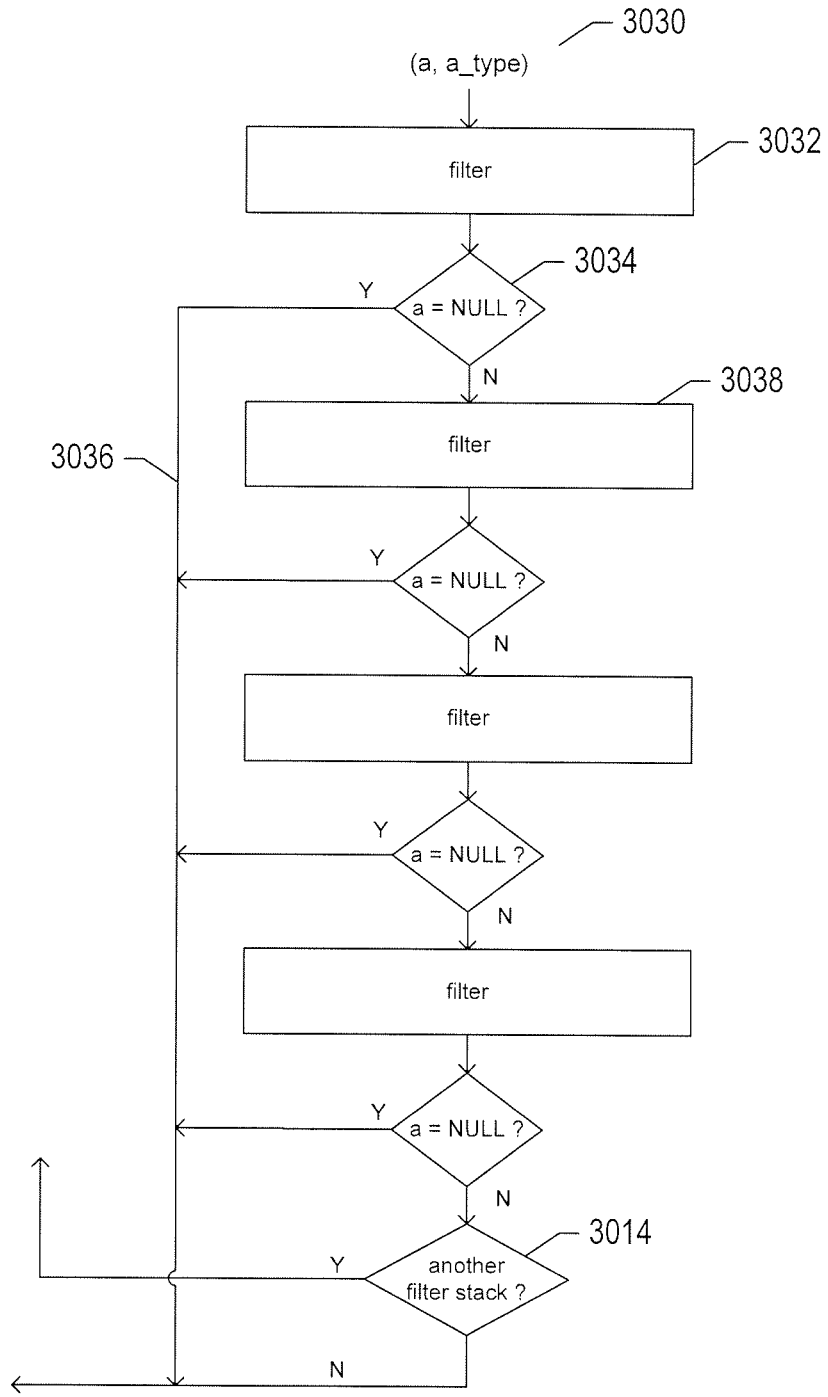

FIGS. 30A-B illustrate a first filtering subsystem that filters actions with respect to known constraints, as discussed above with reference to FIG. 28. An action vector 3002 is analyzed 3004 to determine the type of action vector and to direct the input action vector into an appropriate filter stack. In the example shown in FIG. 30A, dashed arrow 3006 indicates that the input action vector 3003 is directed to filter stack 3008 as a result of the analysis. Each filter in the filter stack is successively applied to the potentially modified action vector emitted from the preceding filter or, in the case of the first filter 3010, is applied to the input action vector. Following application of the final filter in the filter stack 3012, the filter subsystem determines, in a conditional step 3014, whether or not the filtered action vector should be submitted to an additional filter stack or should be output. In the first case, the action vector is resubmitted to a next filter stack, as indicated by arrow 3016, and in the latter case, either a NULL vector 3018 or a potentially modified action vector a' 3020 is output. The filters may be encoded as statements in a higher-level programming language, may be encoded as statements in a script language, may be encoded in logic statements, or may be otherwise encoded, depending on the implementation. In certain implementations, users may define the filter logic through graphical user interfaces.

FIG. 30B illustrates a filter stack. An input action vector and an indication of the action-vector type 3030 are input to the first filter 3032 in the stack. After the first filter is applied to the action vector, the output from the filter is considered in conditional step 3034. When the output is a NULL vector, the remaining filters in the stack are bypassed and the NULL vector is output, as indicated by path 3036. Otherwise, the possibly modified action vector and action-vector type are submitted to the second filter 3038. This process is repeated down through all of the filters of the stack, after which the previously described conditional step 3014 determines whether or not to forward the possibly modified action vector o another filter stack. The ability to redirect the output of one filter stack to another allows inheritance-like functionality, with an initial filter stack processing a generic class of action vectors and additional filter stacks processing more specific classes or types of action vectors within the generic class. More complex object-oriented implementations are also possible.

Figure 31:
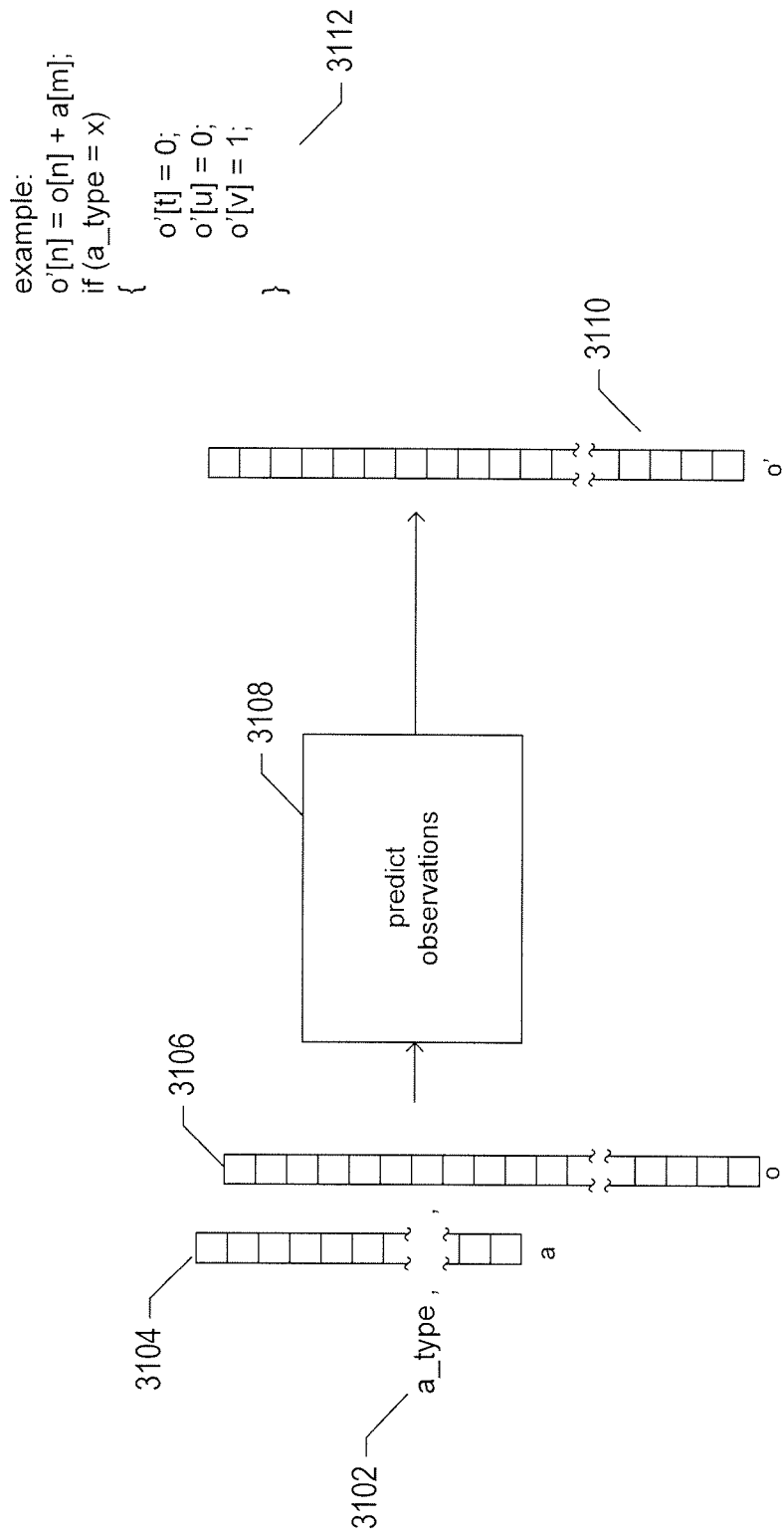
FIG. 31 illustrates observation prediction preceding application of one or more filters of the second type of filter to an action vector, as discussed above with reference to FIG. 29.

FIG. 31 illustrates observation prediction preceding application of one or more filters of the second type of filter to an action vector, as discussed above with reference to FIG. 29. An action-vector type 3102, and an action vector a 3104, and an observation vector o 3106 are submitted to an observations-prediction module 3108 which produces a predicted observation vector o' 3110. The predicted observation vector o', as discussed above, is the prediction of the observation vector that will be returned by the managers environment following execution of the action a. A small portion of an example type of prediction code 3112 is provided in FIG. 31, using similar illustration conventions as used in FIG. 29. Again, rather than predicting an observation vector o', the observations-prediction module 3108 may indicate only changes to the current observation vector o, may provide on a partial predicted observation vector o', or may use other methods to output the information needed for application the second type of filter. In the following discussion, for simplicity, generation of a complete predicted observation vector o' is shown in the examples.

Figure 32A:
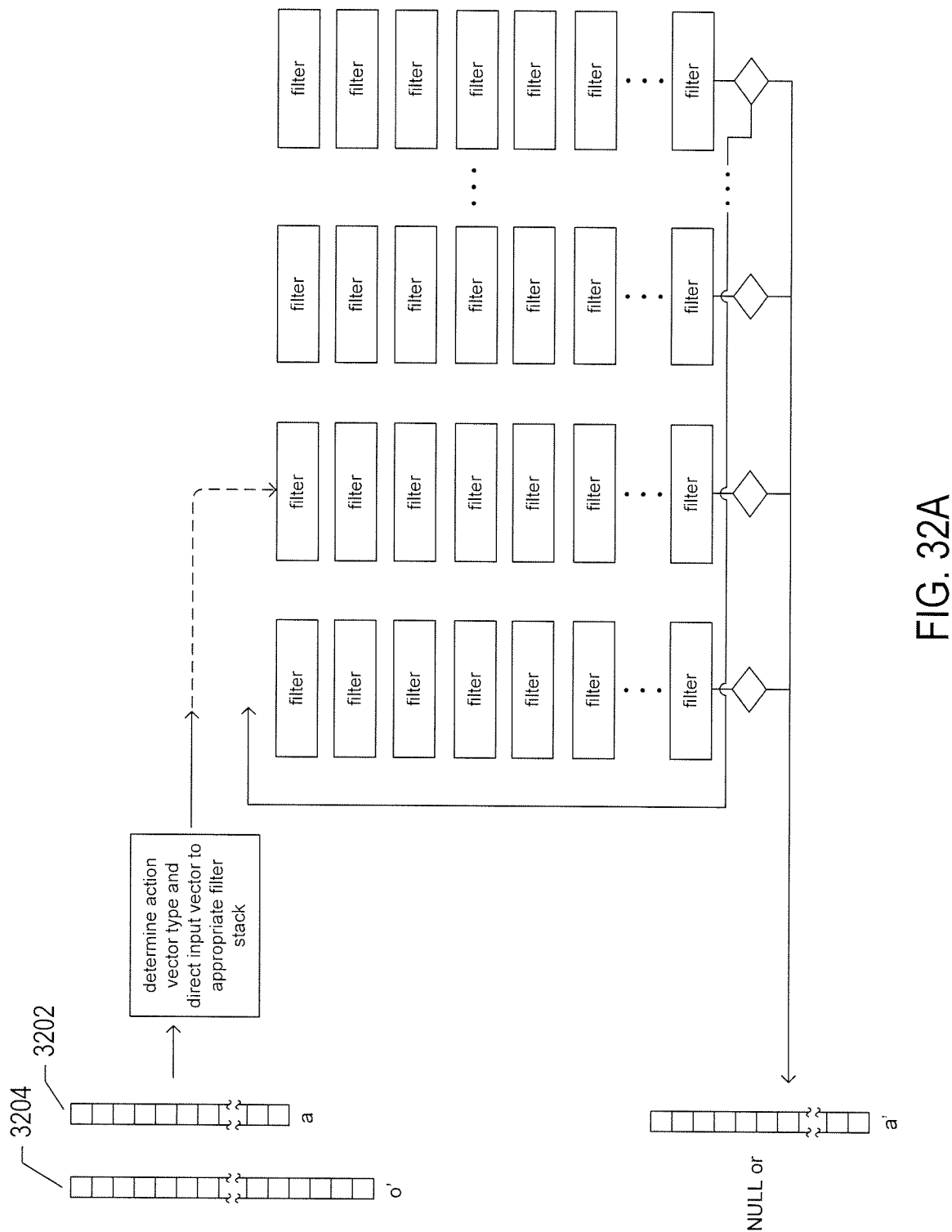
FIGS. 32A-B illustrate a second filtering subsystem that filters action vectors with respect to observation predictions, as discussed above with reference to FIG. 29.
Figure 32B:
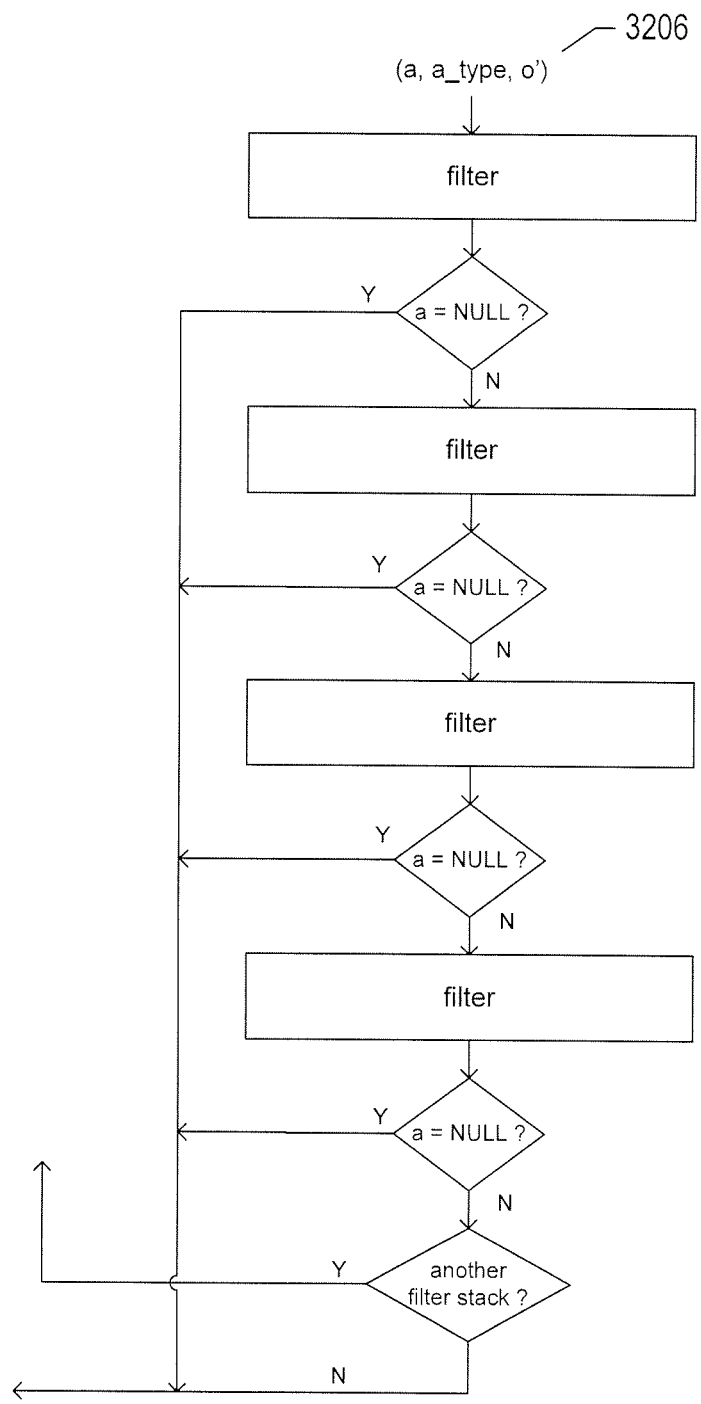

FIGS. 32A-B illustrate a second filtering subsystem that filters action vectors with respect to observation predictions, as discussed above with reference to FIG. 29. FIG. 32A is nearly identical to FIG. 30A, with the exception that the second filtering subsystem receives both an action vector representing an action a 3202 as well as a predicted observation vector o' 3204. Similarly, FIG. 32B shows filter-stack implementation, which is nearly identical to FIG. 30B, with the exception that the input 3206 includes a predicted observations vector o'.

Figure 33:
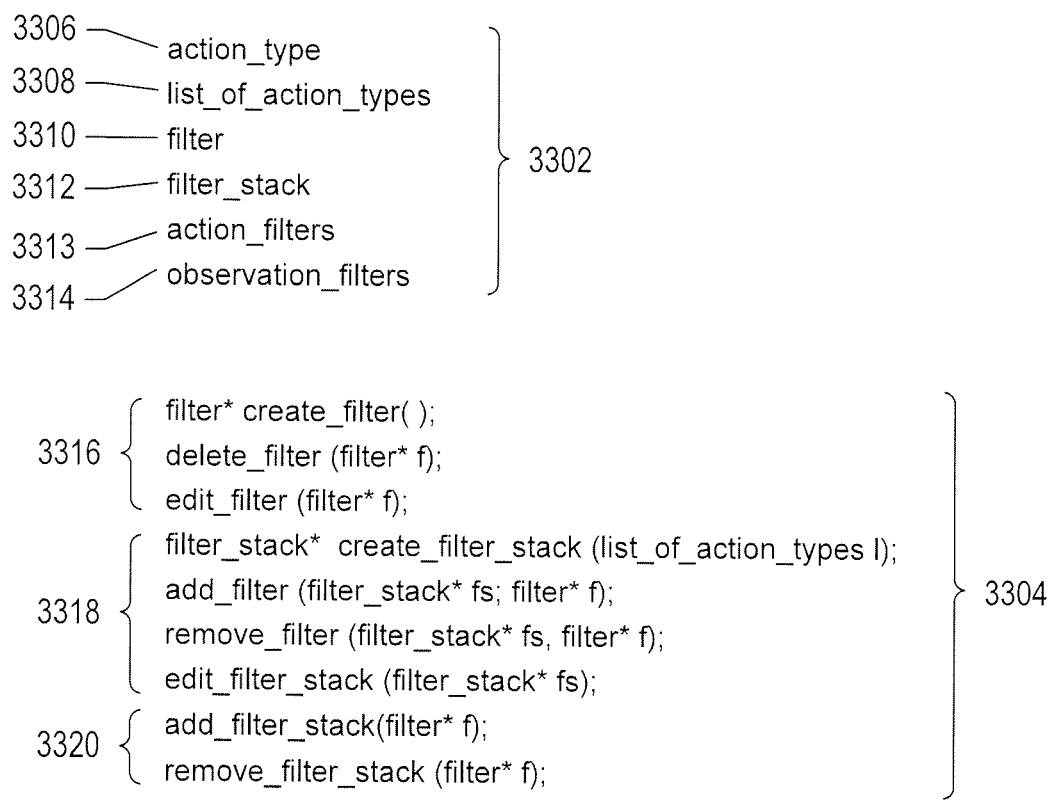
FIG. 33 illustrates a programmatic user interface that may be provided to users to define filters and filter stacks for constraining action vectors.

FIG. 33 illustrates a programmatic user interface that may be provided to users to define filters and filter stacks for constraining action vectors. The programmatic user interface includes libraries that define various fundamental data types 3302 and various functions 3304. The data types may include an action-type 3306, a list of action types 3308, a filter type 3310, a filter-stack type 3312, a first filtering subsystem 3313, and a second filtering subsystem 3314. The functions may include functions to create, delete, and edit filters 3316, functions to create and edit filter stacks as well as to add and remove filters from filter stacks 3318, and functions to add and remove filter stacks from the first and second filtering subsystems 3320. Of course, the detailed function declarations and argument footprints will vary significantly depending on specific implementations as well the data-type declarations.

Figure 34A:
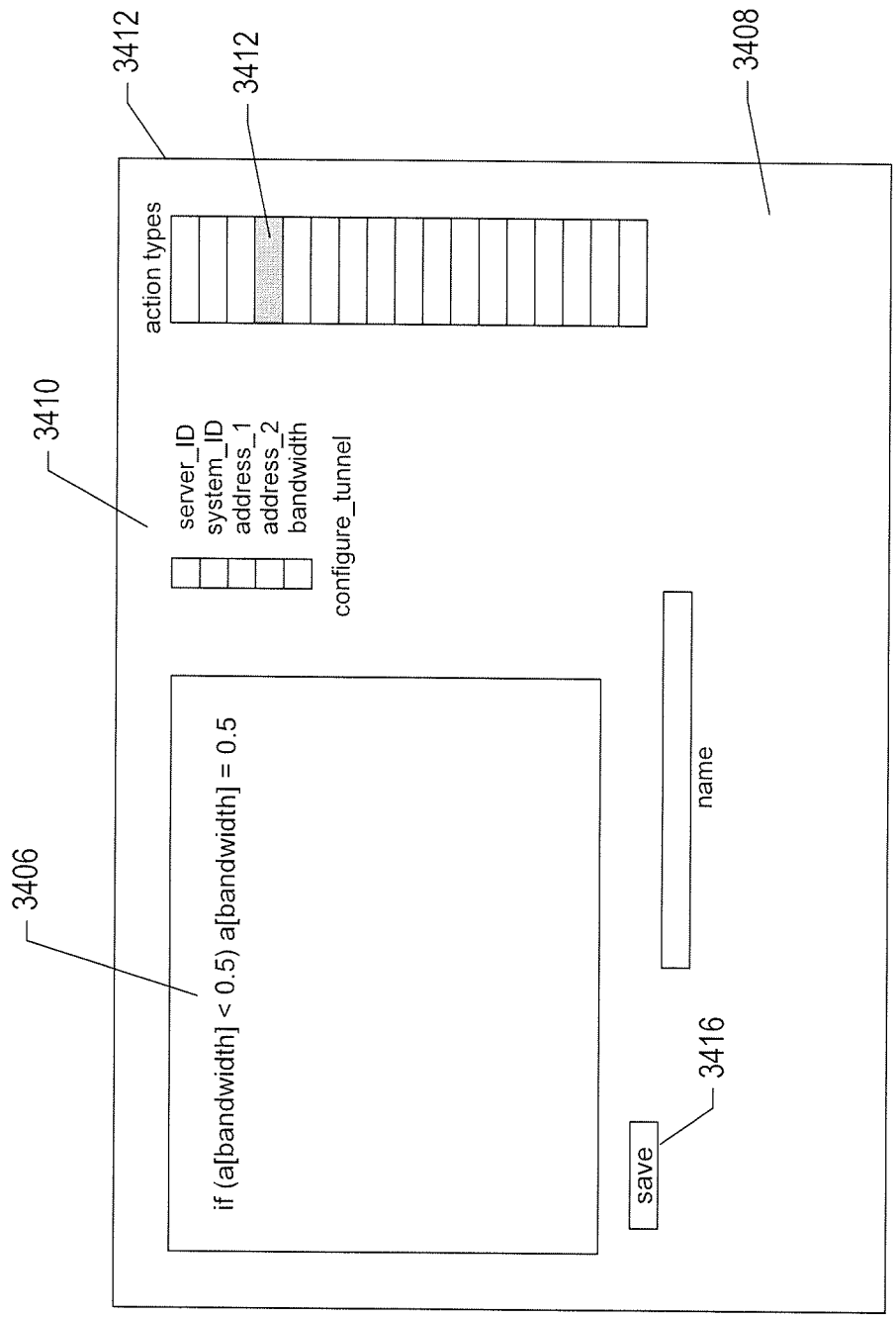
FIGS. 34A-B illustrate a simple graphical user interface that may be provided to users for definition of action-filtering filters, filter stacks, and filtering subsystems.
Figure 34B:
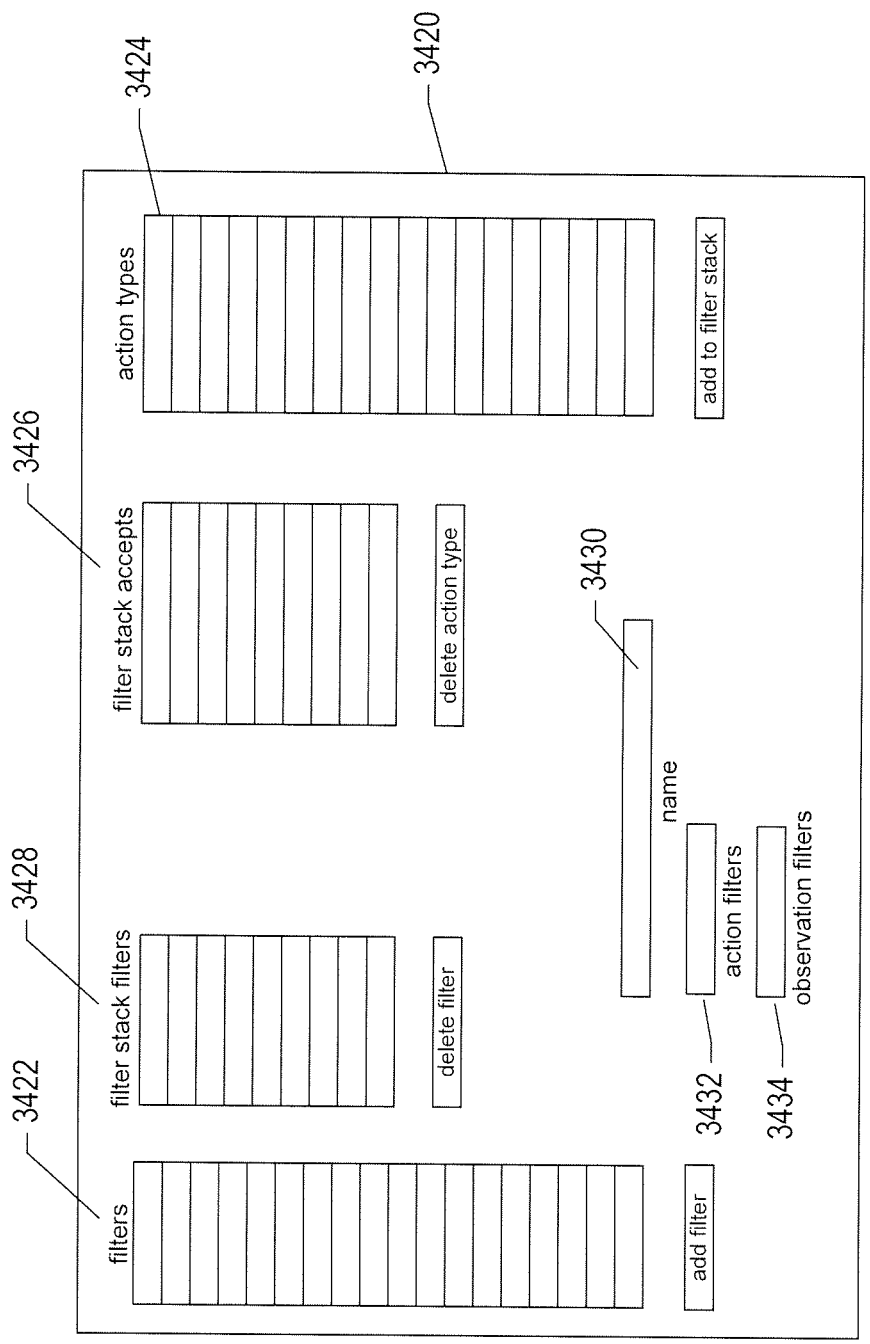

FIGS. 34A-B illustrate a simple graphical user interface that may be provided to users for definition of action-filtering filters, filter stacks, and filtering subsystems. FIG. 34A provides a dashboard-like interface 3402 that includes a logic-entry feature 3406, a list of displayed action types 3408, and a graphical representation of a particular action type 3410 selected 3412 from the displayed action-type list 3408. The input filtering logic can be named by a name-input feature 3414 and saved, using a save feature 3416, as a filter. FIG. 34B shows a dashboard-like interface 3420 that allows a user of an application manager to define filter stacks and add them to filtering subsystems. This interface displays a list of filters 3422, a list of action types 3424, a list of action types accepted by the filter stack being defined 3426, and a list of filters already added to the filter stack being defined 3428. A user may select action types from the displayed action-type list 3422 for addition to the filter stack, can select action types already added to the filter stack for deletion, can select filters from the displayed list of filters 3422 for addition to the filter stack, and can select filters in the displayed list of filters already added to the filter stack 3428 for removal. In addition, the filter stack can be named via a naming feature 3430 and can be added to either of the two filtering subsystems by features 3432 and 3434. Of course, many different possible alternative graphical user interfaces can be implemented.

Figure 35:
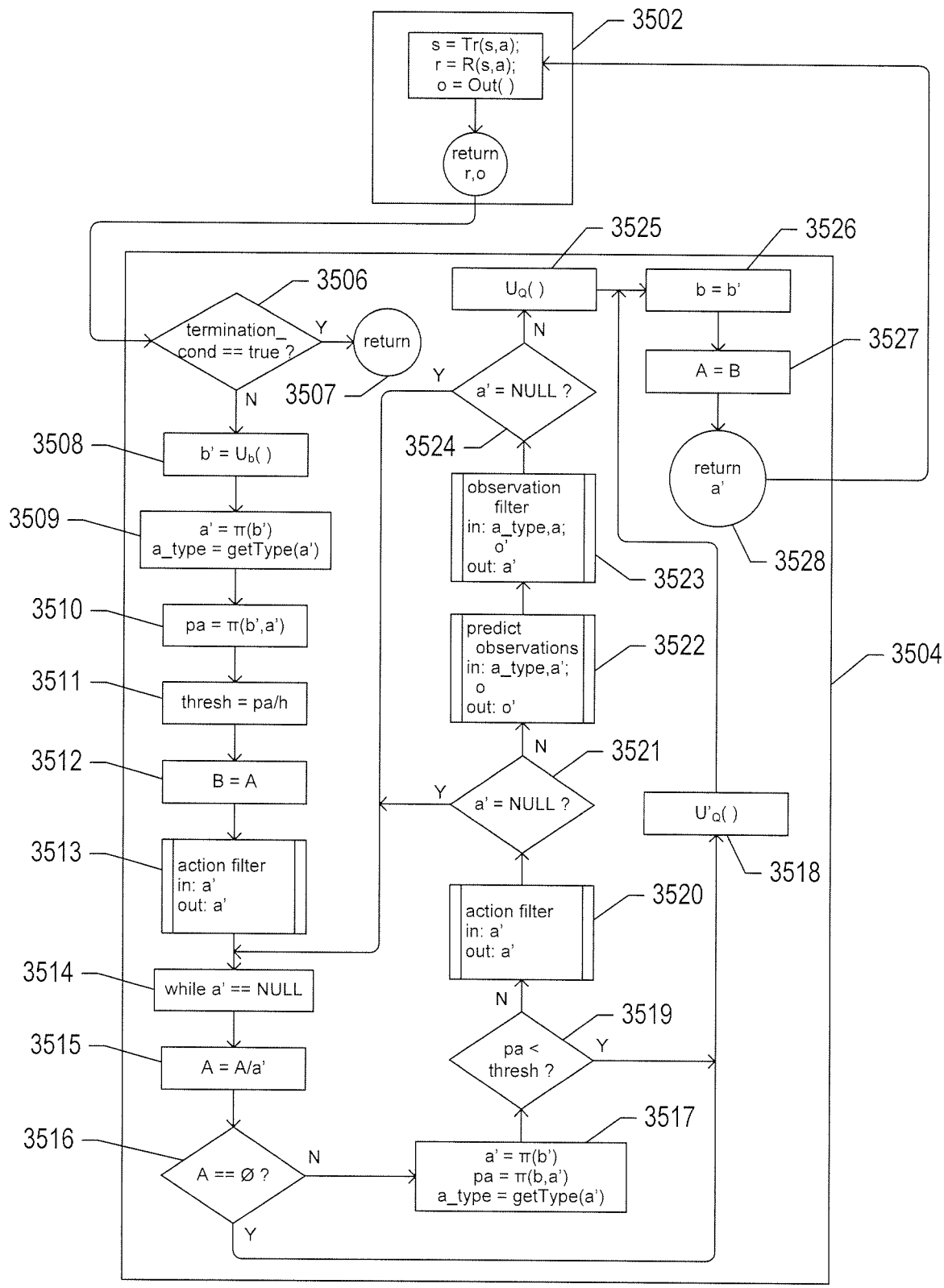
FIG. 35 illustrates application-manager logic of one implementation of the currently disclosed safe-operation-constrained reinforcement-learning-based application manager.

FIG. 35 illustrates application-manager logic of one implementation of the currently disclosed safe-operation-constrained reinforcement-learning-based application manager. This logic is presented using the same illustration conventions as used in FIGS. 18 and 25, discussed above. The logic shown in FIG. 35 adds additional steps to those shown in FIG. 25 and adds calls to filtering subsystems in order to incorporate action filtering of both types, discussed above with reference to FIGS. 28 and 29, into the logic shown in FIG. 25. The managed environment is represented by block 3502, as in FIG. 18. The application manager is represented by block 3504, as in FIGS. 18 and 25. In step 3506, the application manager determines whether or not termination conditions are true. If so, the application manager terminates 3507. Otherwise, in step 3508, an updated belief distribution b' is generated, as in step 2520 of FIG. 25. In step 3509, a next action a' is obtained from the policy, as in step 2522 in FIG. 25, and the application manager determines the action type, a_type, of the next action a'. The action type may be encoded within the action vector representing the action or may be otherwise obtained via a function call. In step 3510, the application manager determines the probability pa of the next action being selected via a call to the probability-returning policy function $\pi(b', a')$, discussed above with reference to FIG. 15. In step 3511, the application manager determines a threshold probability value thresh by dividing pa by parameter h. In step 3512, the application manager sets a temporary set variable B to the value of A. When the cardinality of the set of actions A is large, of course, methods are used to avoid actually copying the contents of the set variable A, but to provide for the equivalent of non-replacement selection of actions from A. In step 3513, the application manager submits the next action a' to the first filtering subsystem discussed above with reference to FIG. 30A. When the first filtering subsystem returns a NULL output, the while-loop of steps 3514-3521 is executed by the application manager. Otherwise, when the first filtering subsystem returns a non-NULL output, control flows to step 3522. In the while-loop of steps 3514-3521, the next action a' is removed from the set of actions A, in step 3515, and, in step 3516, the application manager determines whether or not the set of actions A is now an empty set. If so, then a NULL action or an indication of no action is returned to the managed environment via step 3518. Otherwise, in step 3517, a new next action a', selection probability pa, and action type a_type are determined, as in steps 3509 and 3510. If the probability of selection of the new action is less than the threshold probability thresh, as determined in step 3519, a NULL action or an indication of no action is returned, via step 3518, where a special action-value update function, $U'_Q(\ )$, is called to update the action-value function for the case of a filtered-away action. Otherwise, in step 3520, the application manager calls the first filtering subsystem to filter the new next action a'. When the first filtering subsystem outputs a NULL value, as determined in step 3521, control returns to step 3515 for a next iteration of the while-loop of steps 3514-3521. Otherwise, in step 3522, the application manager calls a routine "predict observations" to generate a predicted observation vector o', as discussed above with reference to FIG. 31. Then, in step 3523, the application manager submits the new next action a' and the predicted observation vector o' to the second filtering subsystem. When the second filtering subsystem returns a NULL value, as determined in step 3524, control flows back to the while-loop that begins with step 3514. Otherwise, in step 3525, the action-value function is updated, as in step 2524 in FIG. 25, the new belief distribution is accepted as the current belief distribution in step 3526, as in step 2526 in FIG. 25, and, in step 3527, the set A it is restored to the value that it had at step 3512. In step 3528, the new action a' is returned to the managed environment. Thus, the application manager, in the described implementation, uses an exploratory policy, filters new actions, and when filtering produces no values, continues to try to generate new non-NULL actions, provided that the new actions have a selection probability greater than some threshold value. Otherwise, a NULL action or an indication of no action is returned to the managed environment. Of course, a NULL action means that no action is to be executed by the managed environment, as a result of which a reward of 0 is generally returned by the managed environment.

Although the present invention has been described in terms of particular embodiments, it is not intended that the invention be limited to these embodiments. Modification within the spirit of the invention will be apparent to those skilled in the art. For example, any of a variety of different implementations of the currently disclosed safe-operation-constrained reinforcement-learning application manager can be obtained by varying any of many different design and implementation parameters, including modular organization, programming language, underlying operating system, control structures, data structures, and other such design and implementation parameters. A wide variety of different types of filters can be employed to filter actions by the application manager in order to constrain expiration of state/action pairs to those that do not produce deleterious consequences for the managed environment. As discussed above, these filters can be encoded in different ways. Additional types of filters may be used, in alternative implementations, along with possibly additional types of filtering subsystems. In certain implementations, only a single filter stack is used to filter all possible action vectors.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A safe-operation-constrained reinforcement-learning-based application manager that manages one or more applications and a computing environment, within which the applications run, comprising one or more of a distributed computing system having multiple computer systems interconnected by one or more networks, a standalone computer system, and a processor-controlled user device, the modular reinforcement-learning based application manager comprising:
   a safe-operation-constrained reinforcement-learning-based application manager that receives rewards and observations from the computing environment and issues actions, indicated by an internally maintained policy $\pi$, to the computing environment; and
   one or more filtering subsystems that apply one or more filters to actions indicated by an internally maintained policy $\pi$ to prevent the safe-operation-constrained reinforcement-learning-based application manager from issuing actions that, if executed by the computing environment, would lead to harmful and undesired results.

2. The safe-operation-constrained reinforcement-learning-based application manager of claim 1
   wherein each action is represented as a vector of values and specifies one or more actions to be carried out by the computing environment; and
   wherein the observations are represented as a vector of values that include metric values, configurations parameters, operational parameters, operation characteristics, and other values indicative of the current application and computing-environment state.

3. The safe-operation-constrained reinforcement-learning-based application manager of claim 2 wherein the safe-operation-constrained reinforcement-learning-based application manager maintains:
   the policy $\pi$;
   a current belief distribution b;
   an action-value-update function;
   a belief-distribution-update function; and
   termination conditions.

4. The safe-operation-constrained reinforcement-learning-based application manager of claim 2 wherein the safe-operation-constrained reinforcement-learning-based application manager:
   continuously
      receives a reward and an observation vector from the computing environment;
      determines a new belief distribution b' using the belief-distribution-update function and observation vector;
      generates a next action a' by applying the policy $\pi$ to the new belief distribution b';
      applies one or more filter subsystems to the next action a'; and
      delivers the next action a' to the computing environment.

5. The safe-operation-constrained reinforcement-learning-based application manager of claim 1
   wherein the one or more filtering subsystems each comprises one or more filter stacks; and
   wherein a filter stack comprises multiple filters.

6. The safe-operation-constrained reinforcement-learning-based application manager of claim 5 wherein a filter receives an input action vector or an input action vector and an observation prediction and returns one of the input action vector, a modified version of the input action vector, or a NULL action vector.

7. The safe-operation-constrained reinforcement-learning-based application manager of claim 6 wherein a first type of filter contains logic that analyzes an input action vector to
   return the input action vector when the action vector represents a safe action; and
   when the input action vector represents an unsafe or deleterious action,
      when the input action vector can be modified to represent a related, safe action, modifies the input action vector and returns the modified action vector, and otherwise returns a NULL action vector.

8. The safe-operation-constrained reinforcement-learning-based application manager of claim 6 wherein a second type of filter contains logic that analyzes an input action vector and an observation prediction to
   return the input action vector when the action vector represents a safe action; and
   when the input action vector represents an unsafe or deleterious action,
      when the input action vector can be modified to represent a related, safe action, modifies the input action vector and returns the modified action vector, and otherwise returns a NULL action vector.

9. The safe-operation-constrained reinforcement-learning-based application manager of claim 5 wherein a filter stack applies the first filter in the filter stack to an input action vector;

successively applies each remaining filter to the vector output from the preceding stack, short-circuiting successive application of the remaining filters when the preceding filter outputs a NULL vector; and returns either a NULL action vector, the input action vector, or a modified action vector.

10. The safe-operation-constrained reinforcement-learning-based application manager of claim 5 wherein a filtering subsystem receives input comprising one of an input action vector and an observation prediction;

determines a filter stack to which to direct the received input;

directs the input to the determined filter stack;

receives an output from the filter stack; and when the input is determined to require additional processing, repeats filter-stack determination to determine a next filter stack and directs the output to the next filter stack to generate a next output, and otherwise returns the output.

11. A method constraining a reinforcement-learning-based application manager to issue safe actions, the method comprising:

including, in the reinforcement-learning-based application manager that manages one or more applications and a computing environment, within which the applications run, comprising one or more of a distributed computing system having multiple computer systems interconnected by one or more networks, a standalone computer system, and a processor-controlled user device, one or more action filtering subsystems that apply one or more filters to actions indicated by a policy $\pi$ internally maintained by the reinforcement-learning-based application manager; and applying, by the reinforcement-learning-based application manager, actions, indicated by an internally maintained policy $\pi$, to one or more action filtering subsystems.

12. The method of claim 11 wherein each action is represented as a vector of values and specifies one or more actions to be carried out by the computing environment; and wherein the observations are represented as a vector of values that include metric values, configurations parameters, operational parameters, operation characteristics, and other values indicative of the current application and computing-environment state.

13. The method of claim 12 wherein the reinforcement-learning-based application manager maintains:

the policy $\pi$;

a current belief distribution b;

an action-value-update function;

a belief-distribution-update function; and termination conditions.

14. The method of claim 13 wherein the reinforcement-learning-based application manager:

continuously receives a reward and an observation vector from the computing environment;

determines a new belief distribution b' using the belief-distribution-update function and observation vector;

generates a next action a' by applying the policy $\pi$ to the new belief distribution b';

applies one or more filter subsystems to the next action a'; and delivers the next action a' to the computing environment.

15. The method of claim 11 wherein the one or more filtering subsystems each comprises one or more filter stacks; and wherein a filter stack comprises multiple filters.

16. The method of claim 15 wherein a filter receives an input action vector or an input action vector and an observation prediction and returns one of the input action vector, a modified version of the input action vector, or a NULL action vector.

17. The method of claim 16 wherein a first type of filter contains logic that analyzes an input action vector to return the input action vector when the action vector represents a safe action; and when the input action vector represents an unsafe or deleterious action, when the input action vector can be modified to represent a related, safe action, modifies the input action vector and returns the modified action vector, and otherwise returns a NULL action vector.

18. The method of claim 16 wherein a second type of filter contains logic that analyzes an input action vector and an observation prediction to return the input action vector when the action vector represents a safe action; and when the input action vector represents an unsafe or deleterious action, when the input action vector can be modified to represent a related, safe action, modifies the input action vector and returns the modified action vector, and otherwise returns a NULL action vector.

19. The method of claim 15 wherein a filter stack applies the first filter in the filter stack to an input action vector;

successively applies each remaining filter to the vector output from the preceding stack, short-circuiting successive application of the remaining filters when the preceding filter outputs a NULL vector; and returns either a NULL action vector, the input action vector, or a modified action vector.

20. The method of claim 15 wherein a filtering subsystem receives input comprising one of an input action vector and an input action vector and observation prediction;

determines a filter stack to which to direct the received input;

directs the input to the determined filter stack;

receives an output from the filter stack; and when the input is determined to require additional processing, repeats filter-stack determination to determine a next filter stack and directs the output to the next filter stack to generate a next output, and otherwise returns the output.

* * * * *